US011525910B2

(12) United States Patent
Fox et al.

(10) Patent No.: US 11,525,910 B2
(45) Date of Patent: Dec. 13, 2022

(54) SYNTHETIC APERTURE RADAR APPARATUS AND METHODS

(71) Applicant: SPACEALPHA INSIGHTS CORP., Vancouver (CA)

(72) Inventors: Peter Allen Fox, Burnaby (CA); Todd Thomas Chisholm, Vancouver (CA); Julie Nutini, Vancouver (CA); Jaklyn Michele De Vos, Vancouver (CA)

(73) Assignee: SPACEALPHA INSIGHTS CORP., Vancouver (CA)

( * ) Notice: Subject to any disclaimer, the term of this patent is extended or adjusted under 35 U.S.C. 154(b) by 218 days.

(21) Appl. No.: 16/766,207

(22) PCT Filed: Nov. 21, 2018

(86) PCT No.: PCT/US2018/062353
§ 371 (c)(1),
(2) Date: May 21, 2020

(87) PCT Pub. No.: WO2019/226194
PCT Pub. Date: Nov. 28, 2019

(65) Prior Publication Data
US 2021/0041556 A1 Feb. 11, 2021

Related U.S. Application Data

(60) Provisional application No. 62/590,153, filed on Nov. 22, 2017.

(51) Int. Cl.
*G01S 13/90* (2006.01)
(52) U.S. Cl.
CPC ...... *G01S 13/9052* (2019.05); *G01S 13/9056* (2019.05); *G01S 13/9076* (2019.05)

(58) Field of Classification Search
CPC ............... G01S 13/904; G01S 13/9052; G01S 13/9056; G01S 13/9076; G01S 13/9094
See application file for complete search history.

(56) References Cited

U.S. PATENT DOCUMENTS

| 3,193,830 A | 7/1965 | Provencher |
| 3,241,140 A | 3/1966 | Raabe |

(Continued)

FOREIGN PATENT DOCUMENTS

| CA | 2 428 513 C | 2/2008 |
| CA | 2 488 909 C | 7/2010 |

(Continued)

OTHER PUBLICATIONS

Mittermayer et al., "Analysis of Range Ambiguity Suppression in SAR by Up and Down Chirp Modulation for Point and Distributed Targets," *IEEE*:4077-4079, 2003.

(Continued)

*Primary Examiner* — Peter M Bythrow
(74) *Attorney, Agent, or Firm* — Seed Intellectual Property Law Group LLP

(57) ABSTRACT

A synthetic aperture radar (SAR) system generates an image of a first swath. The SAR includes at least one SAR antenna, at least one SAR processor and at least one SAR transceiver. In operation the SAR defines a first beam to illuminate the first swath and one or more second beams to illuminate area(s) of ambiguity associated with the first beam. The SAR transmits a pulse via the first beam and receives backscatter energy. The SAR generates a first signal associated with the first beam and one or more second signals associated with the second beam(s). The second signal(s) are combined with determined complex vector(s), generating ambiguity signal(s) and the ambiguity signals are combined with the first signal to generate an image associated with the first swath.

22 Claims, 13 Drawing Sheets

(56) References Cited

U.S. PATENT DOCUMENTS

| | | | |
|---|---|---|---|
| 3,460,139 A | 8/1969 | Rittenbach | |
| 3,601,529 A | 8/1971 | Dischert | |
| 3,715,962 A | 2/1973 | Yost, Jr. | |
| 3,808,357 A | 4/1974 | Nakagaki et al. | |
| 4,163,247 A | 7/1979 | Bock et al. | |
| 4,214,264 A | 7/1980 | Hayward et al. | |
| 4,246,598 A | 1/1981 | Bock et al. | |
| 4,404,586 A | 9/1983 | Tabei | |
| 4,514,755 A | 4/1985 | Tabei | |
| 4,583,177 A | 4/1986 | Meyer | |
| 4,656,508 A | 4/1987 | Yokota | |
| 4,803,645 A | 2/1989 | Ohtomo et al. | |
| 4,823,186 A | 4/1989 | Muramatsu | |
| 4,924,229 A | 5/1990 | Eichel et al. | |
| 4,951,136 A | 8/1990 | Drescher et al. | |
| 4,989,008 A * | 1/1991 | Fujisaka | G01S 13/9052 342/191 |
| 5,057,843 A | 10/1991 | Dubois et al. | |
| 5,059,966 A | 10/1991 | Fujisaka et al. | |
| 5,093,663 A | 3/1992 | Baechtiger et al. | |
| 5,173,949 A | 12/1992 | Peregrim et al. | |
| 5,248,979 A | 9/1993 | Orme et al. | |
| 5,313,210 A | 5/1994 | Gail | |
| 5,486,830 A | 1/1996 | Axline, Jr. et al. | |
| 5,489,907 A | 2/1996 | Zink et al. | |
| 5,512,899 A | 4/1996 | Osawa et al. | |
| 5,546,091 A | 8/1996 | Haugen et al. | |
| 5,552,787 A | 9/1996 | Schuler et al. | |
| 5,646,623 A | 7/1997 | Walters et al. | |
| 5,745,069 A | 4/1998 | Gail | |
| 5,760,732 A * | 6/1998 | Marmarelis | G01S 13/904 367/905 |
| 5,760,899 A | 6/1998 | Eismann | |
| 5,790,188 A | 8/1998 | Sun | |
| 5,821,895 A | 10/1998 | Hounam et al. | |
| 5,883,584 A | 3/1999 | Langemann et al. | |
| 5,926,125 A | 7/1999 | Wood | |
| 5,945,940 A | 8/1999 | Cuomo | |
| 5,949,914 A | 9/1999 | Yuen | |
| 5,952,971 A | 9/1999 | Strickland | |
| 5,973,634 A * | 10/1999 | Kare | G01S 13/904 342/159 |
| 6,007,027 A | 12/1999 | Diekelman et al. | |
| 6,122,404 A | 9/2000 | Barter et al. | |
| 6,241,192 B1 | 6/2001 | Kondo et al. | |
| 6,259,396 B1 | 7/2001 | Pham et al. | |
| 6,347,762 B1 | 2/2002 | Sims et al. | |
| 6,359,584 B1 | 3/2002 | Cordey et al. | |
| 6,502,790 B1 | 1/2003 | Murphy | |
| 6,573,856 B1 | 6/2003 | Obenshain | |
| 6,577,266 B1 | 6/2003 | Axline | |
| 6,614,813 B1 | 9/2003 | Dudley et al. | |
| 6,633,253 B2 | 10/2003 | Cataldo | |
| 6,653,970 B1 | 11/2003 | Mitra | |
| 6,678,048 B1 | 1/2004 | Rienstra et al. | |
| 6,741,250 B1 | 5/2004 | Furlan et al. | |
| 6,781,540 B1 | 8/2004 | MacKey et al. | |
| 6,781,707 B2 | 8/2004 | Peters et al. | |
| 6,831,688 B2 | 12/2004 | Lareau et al. | |
| 6,861,996 B2 | 3/2005 | Jeong | |
| 6,864,827 B1 | 3/2005 | Tise et al. | |
| 6,870,501 B2 | 3/2005 | Beard | |
| 6,914,553 B1 | 7/2005 | Beadle et al. | |
| 6,919,839 B1 | 7/2005 | Beadle et al. | |
| 6,970,142 B1 | 11/2005 | Pleva et al. | |
| 7,015,855 B1 | 3/2006 | Medl et al. | |
| 7,019,777 B2 | 3/2006 | Sun | |
| 7,034,746 B1 | 4/2006 | McMakin et al. | |
| 7,064,702 B1 | 6/2006 | Abatzoglou | |
| 7,071,866 B2 | 7/2006 | Iny et al. | |
| 7,095,359 B2 | 8/2006 | Matsuoka et al. | |
| 7,123,169 B2 | 10/2006 | Farmer et al. | |
| 7,149,366 B1 | 12/2006 | Sun | |
| 7,158,878 B2 | 1/2007 | Rasmussen et al. | |
| 7,167,280 B2 | 1/2007 | Bogdanowicz et al. | |
| 7,212,149 B2 | 5/2007 | Abatzoglou et al. | |
| 7,218,268 B2 * | 5/2007 | VandenBerg | G01S 13/9092 342/25 R |
| 7,242,342 B2 | 7/2007 | Wu et al. | |
| 7,270,299 B1 | 9/2007 | Murphy | |
| 7,292,723 B2 | 11/2007 | Tedesco et al. | |
| 7,298,922 B1 | 11/2007 | Lindgren et al. | |
| 7,327,305 B2 | 2/2008 | Loehner et al. | |
| 7,348,917 B2 | 3/2008 | Stankwitz et al. | |
| 7,379,612 B2 | 5/2008 | Milanfar et al. | |
| 7,385,705 B1 | 6/2008 | Hoctor et al. | |
| 7,412,107 B2 | 8/2008 | Milanfar et al. | |
| 7,414,706 B2 | 8/2008 | Nichols et al. | |
| 7,417,210 B2 | 8/2008 | Ax, Jr. et al. | |
| 7,423,577 B1 | 9/2008 | McIntire et al. | |
| 7,468,504 B2 | 12/2008 | Halvis et al. | |
| 7,475,054 B2 | 1/2009 | Hearing et al. | |
| 7,477,802 B2 | 1/2009 | Milanfar et al. | |
| 7,486,221 B2 | 2/2009 | Meyers et al. | |
| 7,498,994 B2 | 3/2009 | Vacanti | |
| 7,536,365 B2 | 5/2009 | Aboutalib | |
| 7,545,309 B1 | 6/2009 | McIntire et al. | |
| 7,548,185 B2 | 6/2009 | Sheen et al. | |
| 7,570,202 B2 | 8/2009 | Raney | |
| 7,599,790 B2 | 10/2009 | Rasmussen et al. | |
| 7,602,997 B2 | 10/2009 | Young | |
| 7,623,064 B2 | 11/2009 | Calderbank et al. | |
| 7,646,326 B2 | 1/2010 | Antonik et al. | |
| 7,698,668 B2 | 4/2010 | Balasubramanian et al. | |
| 7,705,766 B2 | 4/2010 | Lancashire et al. | |
| 7,733,961 B2 | 6/2010 | O'Hara et al. | |
| 7,746,267 B2 | 6/2010 | Raney | |
| 7,769,229 B2 | 8/2010 | O'Brien et al. | |
| 7,769,241 B2 | 8/2010 | Adams, Jr. et al. | |
| 7,781,716 B2 | 8/2010 | Anderson et al. | |
| 7,825,847 B2 | 11/2010 | Fujimura | |
| 7,830,430 B2 | 11/2010 | Adams, Jr. et al. | |
| 7,844,127 B2 | 11/2010 | Adams, Jr. et al. | |
| 7,855,740 B2 | 12/2010 | Hamilton, Jr. et al. | |
| 7,855,752 B2 | 12/2010 | Baker et al. | |
| 7,876,257 B2 | 1/2011 | Vetro et al. | |
| 7,884,752 B2 | 2/2011 | Hellsten et al. | |
| 7,897,902 B2 | 3/2011 | Katzir et al. | |
| 7,911,372 B2 | 3/2011 | Nelson | |
| 7,924,210 B2 | 4/2011 | Johnson | |
| 7,933,897 B2 | 4/2011 | Jones et al. | |
| 7,936,949 B2 | 5/2011 | Riley et al. | |
| 7,940,282 B2 | 5/2011 | Milanfar et al. | |
| 7,940,959 B2 | 5/2011 | Rubenstein | |
| 7,944,390 B2 | 5/2011 | Krieger et al. | |
| 7,991,226 B2 | 8/2011 | Schultz et al. | |
| 8,013,778 B2 | 9/2011 | Grafmueller et al. | |
| 8,031,258 B2 | 10/2011 | Enge et al. | |
| 8,040,273 B2 | 10/2011 | Tomich et al. | |
| 8,045,024 B2 | 10/2011 | Kumar et al. | |
| 8,049,657 B2 | 11/2011 | Prats et al. | |
| 8,053,720 B2 | 11/2011 | Han et al. | |
| 8,059,023 B2 | 11/2011 | Richard | |
| 8,068,153 B2 | 11/2011 | Kumar et al. | |
| 8,073,246 B2 | 12/2011 | Adams, Jr. et al. | |
| 8,078,009 B2 | 12/2011 | Riley et al. | |
| 8,090,312 B2 | 1/2012 | Robinson | |
| 8,094,960 B2 | 1/2012 | Riley et al. | |
| 8,111,307 B2 | 2/2012 | Deever et al. | |
| 8,115,666 B2 | 2/2012 | Moussally et al. | |
| 8,116,576 B2 | 2/2012 | Kondo | |
| 8,125,370 B1 | 2/2012 | Rogers et al. | |
| 8,125,546 B2 | 2/2012 | Adams, Jr. et al. | |
| 8,134,490 B2 * | 3/2012 | Gebert | G01S 13/904 342/25 R |
| 8,138,961 B2 | 3/2012 | Deshpande | |
| 8,169,358 B1 | 5/2012 | Bourdelais et al. | |
| 8,169,362 B2 | 5/2012 | Cook et al. | |
| 8,179,445 B2 | 5/2012 | Hao | |
| 8,180,851 B1 | 5/2012 | CaveLie | |
| 8,194,296 B2 | 6/2012 | Compton et al. | |
| 8,203,615 B2 | 6/2012 | Wang et al. | |
| 8,203,633 B2 | 6/2012 | Adams, Jr. et al. | |
| 8,204,966 B1 | 6/2012 | Mendis et al. | |

(56) References Cited

U.S. PATENT DOCUMENTS

| | | | |
|---|---|---|---|
| 8,212,711 B1 | 7/2012 | Schultz et al. | |
| 8,258,996 B2* | 9/2012 | Raney | G01S 13/90 |
| | | | 342/25 F |
| 8,274,422 B1 | 9/2012 | Smith et al. | |
| 8,299,959 B2 | 10/2012 | Vossiek et al. | |
| 8,350,771 B1 | 1/2013 | Zaghloul et al. | |
| 8,358,359 B2 | 1/2013 | Baker et al. | |
| 8,362,944 B2 | 1/2013 | Lancashire | |
| 8,384,583 B2 | 2/2013 | Leva et al. | |
| 8,411,146 B2 | 4/2013 | Twede | |
| 8,441,393 B2 | 5/2013 | Strauch et al. | |
| 8,482,452 B2 | 7/2013 | Chambers et al. | |
| 8,487,996 B2 | 7/2013 | Mann et al. | |
| 8,493,262 B2 | 7/2013 | Boufounos et al. | |
| 8,493,264 B2 | 7/2013 | Sasakawa | |
| 8,502,730 B2 | 8/2013 | Roche | |
| 8,532,958 B2 | 9/2013 | Ingram et al. | |
| 8,543,255 B2 | 9/2013 | Wood et al. | |
| 8,558,735 B2 | 10/2013 | Bachmann et al. | |
| 8,576,111 B2 | 11/2013 | Smith et al. | |
| 8,594,375 B1 | 11/2013 | Padwick | |
| 8,610,771 B2 | 12/2013 | Leung et al. | |
| 8,633,851 B2 | 1/2014 | Vacanti et al. | |
| 8,698,668 B2* | 4/2014 | Hellsten | G01S 13/9017 |
| | | | 342/25 R |
| 8,711,029 B2 | 4/2014 | Ferretti et al. | |
| 8,723,721 B2 | 5/2014 | Moruzzis et al. | |
| 8,724,918 B2 | 5/2014 | Abraham | |
| 8,760,634 B2 | 6/2014 | Rose | |
| 8,768,104 B2 | 7/2014 | Moses et al. | |
| 8,803,732 B2 | 8/2014 | Antonik et al. | |
| 8,823,813 B2 | 9/2014 | Mantzel et al. | |
| 8,824,544 B2 | 9/2014 | Nguyen et al. | |
| 8,836,573 B2 | 9/2014 | Yanagihara et al. | |
| 8,854,253 B2 | 10/2014 | Edvardsson | |
| 8,854,255 B1 | 10/2014 | Ehret | |
| 8,860,824 B2 | 10/2014 | Jelinek | |
| 8,861,588 B2 | 10/2014 | Nguyen et al. | |
| 8,879,793 B2 | 11/2014 | Peterson | |
| 8,879,865 B2 | 11/2014 | Li et al. | |
| 8,879,996 B2 | 11/2014 | Kenney et al. | |
| 8,891,066 B2 | 11/2014 | Bamler et al. | |
| 8,903,134 B2 | 12/2014 | Abileah | |
| 8,912,950 B2 | 12/2014 | Adcook | |
| 8,957,806 B2 | 2/2015 | Schaefer | |
| 8,977,062 B2 | 3/2015 | Gonzalez et al. | |
| 8,988,273 B2 | 3/2015 | Marianer et al. | |
| 9,013,348 B2 | 4/2015 | Riedel et al. | |
| 9,019,143 B2 | 4/2015 | Obermeyer | |
| 9,019,144 B2* | 4/2015 | Calabrese | G01S 13/9029 |
| | | | 342/25 C |
| 9,037,414 B1 | 5/2015 | Pratt | |
| 9,063,544 B2 | 6/2015 | Vian et al. | |
| 9,071,337 B2 | 6/2015 | Hellsten | |
| 9,106,857 B1 | 8/2015 | Faramarzpour | |
| 9,126,700 B2 | 9/2015 | Ozkul et al. | |
| 9,134,414 B2* | 9/2015 | Bergeron | G01S 13/904 |
| 9,148,601 B2 | 9/2015 | Fox | |
| 9,176,227 B2 | 11/2015 | Bergeron et al. | |
| 9,182,483 B2 | 11/2015 | Liu et al. | |
| 9,210,403 B2 | 12/2015 | Martinerie et al. | |
| 9,223,015 B2 | 12/2015 | Kojima | |
| 9,244,155 B2 | 1/2016 | Bielas | |
| 9,261,592 B2 | 2/2016 | Boufounos et al. | |
| 9,291,711 B2 | 3/2016 | Healy, Jr. et al. | |
| 9,329,263 B2 | 5/2016 | Haynes et al. | |
| 9,389,311 B1 | 7/2016 | Moya et al. | |
| 9,395,437 B2 | 7/2016 | Ton et al. | |
| 9,400,329 B2 | 7/2016 | Pillay | |
| 9,411,039 B2 | 8/2016 | Dehlink et al. | |
| 9,417,323 B2* | 8/2016 | Carande | G01S 13/9023 |
| 9,426,397 B2 | 8/2016 | Wein | |
| 9,523,768 B1* | 12/2016 | Rincon | G01S 13/9023 |
| 9,529,081 B2 | 12/2016 | Whelan et al. | |
| 9,531,081 B2 | 12/2016 | Huber et al. | |
| 9,535,151 B2 | 1/2017 | Lynch | |
| 9,684,071 B2 | 6/2017 | Wishart | |
| 9,684,673 B2 | 6/2017 | Beckett et al. | |
| 9,865,935 B2 | 1/2018 | Miraftab et al. | |
| 9,945,942 B2 | 4/2018 | Guy | |
| 9,947,128 B2 | 4/2018 | Korb et al. | |
| 9,978,013 B2 | 5/2018 | Kaufhold | |
| 10,132,920 B2 | 11/2018 | Hintz | |
| 10,203,405 B2 | 2/2019 | Mazzaro et al. | |
| 10,209,346 B2 | 2/2019 | Malinovskiy et al. | |
| 10,230,925 B2 | 3/2019 | Maciejewski et al. | |
| 10,283,866 B2 | 5/2019 | Luo et al. | |
| 10,490,079 B2 | 11/2019 | Schild | |
| 10,663,571 B2 | 5/2020 | Halbert et al. | |
| 10,955,546 B2 | 3/2021 | Fox | |
| 2001/0013566 A1 | 8/2001 | Yung et al. | |
| 2002/0003502 A1 | 1/2002 | Falk | |
| 2002/0147544 A1 | 10/2002 | Nicosia et al. | |
| 2003/0006364 A1 | 1/2003 | Katzir et al. | |
| 2004/0021600 A1* | 2/2004 | Wittenberg | G01S 13/9041 |
| | | | 342/158 |
| 2004/0104859 A1 | 6/2004 | Lo | |
| 2004/0150547 A1 | 8/2004 | Suess et al. | |
| 2004/0227659 A1 | 11/2004 | Woodford et al. | |
| 2005/0288859 A1 | 12/2005 | Golding et al. | |
| 2006/0164288 A1 | 7/2006 | Voelker | |
| 2007/0024879 A1 | 2/2007 | Hamilton, Jr. et al. | |
| 2007/0051890 A1 | 3/2007 | Pittman | |
| 2007/0080830 A1 | 4/2007 | Sacks | |
| 2007/0102629 A1 | 5/2007 | Richard et al. | |
| 2007/0120979 A1 | 5/2007 | Zhang et al. | |
| 2007/0146195 A1 | 6/2007 | Wallenberg et al. | |
| 2007/0168370 A1 | 7/2007 | Hardy | |
| 2007/0192391 A1 | 8/2007 | McEwan | |
| 2007/0279284 A1 | 12/2007 | Karayil Thekkoott Narayanan | |
| 2008/0123997 A1 | 5/2008 | Adams et al. | |
| 2008/0240602 A1 | 10/2008 | Adams et al. | |
| 2009/0011777 A1 | 1/2009 | Grunebach et al. | |
| 2009/0021588 A1 | 1/2009 | Border et al. | |
| 2009/0046182 A1 | 2/2009 | Adams, Jr. et al. | |
| 2009/0046995 A1 | 2/2009 | Kanumuri et al. | |
| 2009/0051585 A1 | 2/2009 | Krikorian et al. | |
| 2009/0087087 A1 | 4/2009 | Palum et al. | |
| 2009/0147112 A1 | 6/2009 | Baldwin | |
| 2009/0226114 A1 | 9/2009 | Choi et al. | |
| 2009/0256909 A1 | 10/2009 | Nixon | |
| 2009/0289838 A1 | 11/2009 | Braun | |
| 2010/0039313 A1 | 2/2010 | Morris | |
| 2010/0045513 A1 | 2/2010 | Pett et al. | |
| 2010/0063733 A1 | 3/2010 | Yunck | |
| 2010/0128137 A1 | 5/2010 | Guidash | |
| 2010/0149396 A1 | 6/2010 | Summa et al. | |
| 2010/0194901 A1 | 8/2010 | van Hoorebeke et al. | |
| 2010/0207808 A1* | 8/2010 | Prats | G01S 13/904 |
| | | | 342/25 F |
| 2010/0232692 A1 | 9/2010 | Kumar et al. | |
| 2010/0302418 A1 | 12/2010 | Adams, Jr. et al. | |
| 2010/0309347 A1 | 12/2010 | Adams, Jr. et al. | |
| 2010/0321235 A1 | 12/2010 | Vossiek et al. | |
| 2010/0328499 A1 | 12/2010 | Sun | |
| 2011/0052095 A1 | 3/2011 | Deever | |
| 2011/0055290 A1 | 3/2011 | Li et al. | |
| 2011/0098986 A1 | 4/2011 | Fernandes Rodrigues et al. | |
| 2011/0115793 A1 | 5/2011 | Grycewicz | |
| 2011/0115954 A1 | 5/2011 | Compton | |
| 2011/0134224 A1 | 6/2011 | McClatchie | |
| 2011/0156878 A1 | 6/2011 | Wu et al. | |
| 2011/0175771 A1* | 7/2011 | Raney | G01S 7/026 |
| | | | 342/25 F |
| 2011/0187902 A1 | 8/2011 | Adams, Jr. et al. | |
| 2011/0199492 A1 | 8/2011 | Kauker et al. | |
| 2011/0279702 A1 | 11/2011 | Plowman et al. | |
| 2011/0282871 A1 | 11/2011 | Seefeld et al. | |
| 2012/0019660 A1 | 1/2012 | Golan et al. | |
| 2012/0044328 A1 | 2/2012 | Gere | |
| 2012/0076229 A1 | 3/2012 | Brobston et al. | |
| 2012/0105276 A1 | 5/2012 | Ryland | |
| 2012/0127331 A1 | 5/2012 | Grycewicz | |
| 2012/0133550 A1 | 5/2012 | Benninghofen et al. | |

(56) References Cited

U.S. PATENT DOCUMENTS

| | | |
|---|---|---|
| 2012/0146869 A1 | 6/2012 | Holland et al. |
| 2012/0154584 A1 | 6/2012 | Omer et al. |
| 2012/0182171 A1 | 7/2012 | Martone et al. |
| 2012/0200703 A1 | 8/2012 | Nadir et al. |
| 2012/0201427 A1 | 8/2012 | Jasinski et al. |
| 2012/0257047 A1 | 10/2012 | Biesemans et al. |
| 2012/0268318 A1* | 10/2012 | Jin .............. G01S 13/904 342/25 F |
| 2012/0271609 A1 | 10/2012 | Laake et al. |
| 2012/0274505 A1 | 11/2012 | Pritt et al. |
| 2012/0293669 A1 | 11/2012 | Mann et al. |
| 2012/0323992 A1 | 12/2012 | Brobst et al. |
| 2013/0021475 A1 | 1/2013 | Canant et al. |
| 2013/0050488 A1 | 2/2013 | Brouard et al. |
| 2013/0063489 A1 | 3/2013 | Hourie et al. |
| 2013/0080594 A1 | 3/2013 | Nourse et al. |
| 2013/0120205 A1 | 5/2013 | Thomson et al. |
| 2013/0169471 A1 | 7/2013 | Lynch |
| 2013/0234879 A1 | 9/2013 | Wilson-Langman et al. |
| 2013/0257641 A1 | 10/2013 | Ronning |
| 2013/0321228 A1 | 12/2013 | Crockett, Jr. et al. |
| 2013/0321229 A1 | 12/2013 | Klefenz et al. |
| 2013/0335256 A1 | 12/2013 | Smith et al. |
| 2014/0027576 A1 | 1/2014 | Boshuizen et al. |
| 2014/0062764 A1 | 3/2014 | Reis et al. |
| 2014/0068439 A1 | 3/2014 | Lacaze et al. |
| 2014/0078153 A1 | 3/2014 | Richardson |
| 2014/0149372 A1 | 5/2014 | Sankar et al. |
| 2014/0191894 A1 | 7/2014 | Chen et al. |
| 2014/0232591 A1 | 8/2014 | Liu et al. |
| 2014/0266868 A1 | 9/2014 | Schuman |
| 2014/0282035 A1 | 9/2014 | Murthy et al. |
| 2014/0307950 A1 | 10/2014 | Jancsary et al. |
| 2014/0313071 A1 | 10/2014 | McCorkle |
| 2014/0344296 A1 | 11/2014 | Chawathe et al. |
| 2014/0372421 A1 | 12/2014 | Seacat DeLuca et al. |
| 2015/0015692 A1 | 1/2015 | Smart |
| 2015/0080725 A1 | 3/2015 | Wegner |
| 2015/0145716 A1 | 5/2015 | Woodsum |
| 2015/0160337 A1 | 6/2015 | Muff |
| 2015/0168554 A1 | 6/2015 | Aharoni et al. |
| 2015/0247923 A1 | 9/2015 | LaBarca et al. |
| 2015/0253423 A1 | 9/2015 | Liu et al. |
| 2015/0280326 A1 | 10/2015 | Arii |
| 2015/0323659 A1 | 11/2015 | Mitchell |
| 2015/0323665 A1 | 11/2015 | Murata |
| 2015/0323666 A1 | 11/2015 | Murata |
| 2015/0324989 A1 | 11/2015 | Smith et al. |
| 2015/0331097 A1 | 11/2015 | Hellsten |
| 2015/0346336 A1* | 12/2015 | Di Giorgio .............. B64G 1/405 342/25 C |
| 2015/0369913 A1 | 12/2015 | Jung et al. |
| 2015/0378004 A1 | 12/2015 | Wilson-Langman et al. |
| 2015/0378018 A1* | 12/2015 | Calabrese .............. G06T 1/0007 342/25 A |
| 2015/0379957 A1 | 12/2015 | Roegelein et al. |
| 2016/0012367 A1 | 1/2016 | Korb et al. |
| 2016/0020848 A1 | 1/2016 | Leonard |
| 2016/0033639 A1 | 2/2016 | Jung et al. |
| 2016/0109570 A1 | 4/2016 | Calabrese |
| 2016/0131739 A1 | 5/2016 | Jinkins et al. |
| 2016/0139259 A1 | 5/2016 | Rappaport et al. |
| 2016/0139261 A1 | 5/2016 | Becker |
| 2016/0170018 A1 | 6/2016 | Yamaoka |
| 2016/0216372 A1 | 7/2016 | Liu et al. |
| 2016/0223642 A1 | 8/2016 | Moore et al. |
| 2016/0306824 A1 | 10/2016 | Lopez et al. |
| 2016/0320481 A1 | 11/2016 | Ling et al. |
| 2017/0160381 A1 | 6/2017 | Cho et al. |
| 2017/0161638 A1 | 6/2017 | Garagic et al. |
| 2017/0293019 A1 | 10/2017 | Caldwell et al. |
| 2017/0315234 A1 | 11/2017 | Steenstrup et al. |
| 2018/0074185 A1* | 3/2018 | Capraro .............. G01S 13/5244 |
| 2018/0165121 A1 | 6/2018 | Rights et al. |
| 2018/0172823 A1 | 6/2018 | Tyc |
| 2018/0172824 A1 | 6/2018 | Beckett et al. |
| 2018/0252807 A1 | 9/2018 | Fox |
| 2018/0335518 A1* | 11/2018 | Fox .......................... G01S 7/025 |
| 2018/0348361 A1* | 12/2018 | Turbide .............. G01S 13/9023 |
| 2018/0366837 A1 | 12/2018 | Fox et al. |
| 2019/0101639 A1* | 4/2019 | Rincon ................ H01Q 21/065 |

FOREIGN PATENT DOCUMENTS

| | | |
|---|---|---|
| CA | 2 553 008 C | 8/2011 |
| CA | 2 827 279 A1 | 4/2014 |
| CN | 101907704 A | 12/2010 |
| CN | 102394379 A | 3/2012 |
| CN | 102983410 A | 3/2013 |
| CN | 103414027 A | 11/2013 |
| CN | 103679714 A | 3/2014 |
| DE | 296 155 A5 | 11/1991 |
| DE | 10 2005 010155 A1 | 9/2006 |
| DE | 10 2007 039 095 A1 | 2/2009 |
| DE | 20 2009 003 286 U1 | 5/2009 |
| DE | 10 2015 221439 B3 | 5/2017 |
| EP | 0924534 A2 | 6/1999 |
| EP | 0846960 B1 | 3/2004 |
| EP | 1504287 | 2/2005 |
| EP | 1698856 A2 | 9/2006 |
| EP | 1509784 B1 | 2/2008 |
| EP | 1746437 B1 | 9/2008 |
| EP | 2230533 A1 | 9/2010 |
| EP | 2242252 A2 | 10/2010 |
| EP | 2416174 A1 | 2/2012 |
| EP | 2392943 B1 | 11/2012 |
| EP | 2560144 A2 | 2/2013 |
| EP | 2610636 A1 | 7/2013 |
| EP | 2762916 A2 | 8/2014 |
| EP | 2778635 A1 | 9/2014 |
| EP | 2828685 | 1/2015 |
| EP | 2875384 | 5/2015 |
| EP | 2662704 B1 | 1/2016 |
| EP | 2743727 B1 | 1/2016 |
| EP | 2759847 B1 | 1/2016 |
| EP | 2762917 B1 | 1/2016 |
| EP | 2767849 B1 | 1/2016 |
| EP | 2896971 B1 | 3/2016 |
| EP | 3012658 A1 | 4/2016 |
| EP | 3032648 A1 | 6/2016 |
| EP | 3056922 A2 | 8/2016 |
| EP | 3060939 | 8/2016 |
| EP | 2784537 B1 | 10/2016 |
| EP | 3077985 | 10/2016 |
| EP | 3077986 | 10/2016 |
| EP | 1966630 B1 | 4/2017 |
| EP | 3214460 A1 | 9/2017 |
| JP | 56108976 A | 8/1981 |
| JP | 60257380 A | 12/1985 |
| JP | 2001122199 A | 5/2001 |
| JP | 4917206 B2 | 4/2012 |
| KR | 10-2010-0035056 A | 4/2010 |
| KR | 10-2012-0000842 A | 1/2012 |
| KR | 10-1461129 B1 | 11/2014 |
| KR | 10-2016-0002694 A | 1/2016 |
| RU | 2 349 513 C2 | 3/2009 |
| WO | WO 0055602 A1 | 9/2000 |
| WO | WO 0218874 A1 | 3/2002 |
| WO | WO 03005059 A1 | 1/2003 |
| WO | WO 03040653 A1 | 5/2003 |
| WO | WO 03055080 A2 | 7/2003 |
| WO | WO 03096064 A1 | 11/2003 |
| WO | WO 2007076824 A2 | 7/2007 |
| WO | WO 2009025825 A1 | 2/2009 |
| WO | WO 2009030339 A1 | 3/2009 |
| WO | WO 2009085305 A1 | 7/2009 |
| WO | WO 2010052530 A1 | 5/2010 |
| WO | WO 2010122327 A1 | 10/2010 |
| WO | WO 2011138744 A2 | 11/2011 |
| WO | WO 2011154804 A1 | 12/2011 |
| WO | WO 2012120137 A1 | 9/2012 |
| WO | WO 2012143756 A1 | 10/2012 |
| WO | WO 2012148919 A2 | 11/2012 |
| WO | WO 2013112955 A1 | 8/2013 |

(56) References Cited

FOREIGN PATENT DOCUMENTS

| WO | WO 2013162657 A1 | 10/2013 |
|---|---|---|
| WO | WO 2014012828 A1 | 1/2014 |
| WO | WO 2014089318 A1 | 6/2014 |
| WO | WO 2014097263 A1 | 6/2014 |
| WO | WO 2015059043 A1 | 4/2015 |
| WO | WO 2015112263 A2 | 7/2015 |
| WO | WO 2015130365 A2 | 9/2015 |
| WO | WO 2015192056 A1 | 12/2015 |
| WO | WO 2016022637 A1 | 2/2016 |
| WO | WO 2016132106 A1 | 8/2016 |
| WO | WO 2016153914 A1 | 9/2016 |
| WO | WO 2016202662 A1 | 12/2016 |
| WO | WO 2016205406 A1 | 12/2016 |
| WO | WO 2017031013 A1 | 2/2017 |
| WO | WO 2017044168 A2 | 3/2017 |
| WO | WO 2017048339 A1 | 3/2017 |
| WO | WO 2017091747 A1 | 6/2017 |
| WO | WO 2017094157 A1 | 6/2017 |

OTHER PUBLICATIONS

He et al., "Digital Beamforming on Receive in Elevation for Multidimensional Waveform Encoding SAR Sensing," *IEEE Geoscience and Remote Sensing Letters* 11(12):2173-2177, Dec. 2014.

Raney et al., "Improved Range Ambiguity Performance in Quad-Pol SAR," IEEE Transactions on Geoscience and Remote Sensing:1-8, Jan. 30, 2011.

Extended European Search Report, dated Oct. 20, 2021, for European Application No. 18919424.4, 11 pages.

"ISR Systems and Technology," Lincoln Laboratory, Massachusetts Institute of Technology, archived Jan. 19, 2017, URL=https://www.ll.mit.edu/mission/isr/israccomplishments.html, download date Oct. 8, 2018, 2 pages.

"Northrop's SABR radar completes auto target cueing capability demonstration," May 20, 2013, URL=https://www.airforce-technology.com/news/newsnorthrops-sabr-radar-completes-auto-target-cueing-capability-demonstration/, download date Oct. 8, 2018, 3 pages.

Amendment, filed Jan. 17, 2019, for U.S. Appl. No. 15/101,336, Lopez et al., "Systems and Methods for Earth Observation," 25 pages.

Amendment, filed Sep. 5, 2018, for U.S. Appl. No. 15/316,469, Maciejewski et al., "Systems and Methods for Processing and Providing Terrestrial and/or Space-Based Earth Observation Video," 9 pages.

Analog Devices, "Fundamentals of Direct Digital Synthesis (DDS)," MT-085 Tutorial, Oct. 2008, 9 pages.

Beckett et al., "Systems and Methods for Enhancing Synthetic Aperture Radar Imagery," U.S. Appl. No. 62/180,449, filed Jun. 16, 2015, 34 pages.

Beckett, "UrtheCast Second-Generation Earth Observation Sensors," *36th International Symposium on Remote Sensing of Environment*, Berlin, Germany, May 11-15, 2015, pp. 1069-1073.

Bickel et al., "Effects of Magneto-Ionic Propagation on the Polarization Scattering Matrix," *Proceedings of the IEEE* 53(8):1089-1091, Aug. 1965.

Bidigare, "MIMO Capacity of Radar as a Communications Channel," *Adaptive Sensor and Array Processing Workshop*, Lexington, Massachusetts, USA, Mar. 11-13, 2003, 19 pages.

Boccia, "Bathymetric Digital Elevation Model Generation from L-band and X-band Synthetic Aperture Radar Images in the Gulf of Naples, Italy: Innovative Techniques and Experimental Results," doctoral thesis, University of Naples Federico II, Naples, Italy, 2015, 161 pages.

Bordoni et al., "Ambiguity Suppression by Azimuth Phase Coding in Multichannel SAR Systems," *International Geoscience and Remote Sensing Symposium*, Vancouver, Canada, Jul. 24-29, 2011, 16 pages.

Bordoni et al., "Calibration Error Model for Multichannel Spaceborne SAR Systems Based on Digital Beamforming," *10th European Radar Conference*, Nuremberg, Germany, Oct. 9-11, 2013, pp. 184-187.

Brysk, "Measurement of the Scattering Matrix with an Intervening Ionosphere," *Transactions of the American Institute of Electrical Engineers* 77(5):611-612, 1958.

Caltagirone et al., "The COSMO-SkyMed Dual Use Earth Observation Program: Development, Qualification, and Results of the Commissioning of the Overall Constellation," *IEEE Journal of Selected Topics in Applied Earth Observations and Remote Sensing* 7(7):2754-2762, Jul. 2014.

Communication pursuant to Article 94(3) EPC, dated Jun. 4, 2020, for European application No. 16846990.6 5 pages.

Communication pursuant to Article 94(3) EPC, dated Nov. 24, 2017, for European Application No. 14883549.9, 8 pages.

D'Aria et al., "A Wide Swath, Full Polarimetric, L band spaceborne SAR," *IEEE Radar Conference*, May 2008, 4 pages.

Di Iorio et al., "Innovation Technologies and Applications for Coastal Archaeological sites FP7—ITACA," *36th International Symposium on Remote Sensing of Environment*, Berlin, Germany, May 11-15, 2015, pp. 1367-1373.

El Sanhoury et al., "Performance Improvement of Pulsed OFDM UWB Systems Using ATF coding," *International Conference on Computer and Communication Engineering*, Kuala Lumpur, Malaysia, May 11-13, 2010, 4 pages.

European Partial Search Report, dated Dec. 21, 2017, for European Application No. 15829734.1, 16 pages.

European Partial Search Report, dated May 18, 2018, for European Application No. 16846990.6, 16 pages.

Evans, "Venus, Unmasked: 25 Years Since the Arrival of Magellan at Earth's Evil Twin," Aug. 10, 2015, URL=http://www.americaspace.com/2015/08/10/venus-unmasked-25-years-since-the-arrival-of-magellan-at-earths-evil-twin/, download date Oct. 8, 2018, 4 pages.

Extended European Search Report, dated Apr. 25, 2018, for European Application No. 16844829.8, 9 pages.

Extended European Search Report, dated Aug. 16, 2018, for European Application No. 16846990.6, 16 pages.

Extended European Search Report, dated Feb. 12, 2021, for European Application No. 18805658.4, 11 pages.

Extended European Search Report, dated Feb. 18, 2021, for European Application No. 18805871.3, 9 pages.

Extended European Search Report, dated Jun. 3, 2019, for European Application No. 16869291.1, 5 pages.

Extended European Search Report, dated Mar. 27, 2018, for European Application No. 15829734.1, 18 pages.

Extended European Search Report, dated May 14, 2018, for European Application No. 16812363.6, 8 pages.

Extended European Search Report, dated Oct. 24, 2016, for European Application No. 14880012.1, 10 pages.

Extended European Search Report, dated Oct. 24, 2016, for European Application No. 14883549.9, 10 pages.

Fard et al., "Classifier Fusion of High-Resolution Optical and Synthetic Aperture Radar (SAR) Satellite Imagery for Classification in Urban Area," *1st International Conference on Geospatial Information Research*, Tehran, Iran, Nov. 15-17, 2014, 5 pages.

Foody, "Status of land cover classification accuracy assessment," *Remote Sensing of Environment*, 50:185-201, 2002.

Forkuor et al., "Integration of Optical and Synthetic Aperture Radar Imagery for Improving Crop Mapping in Northwestern Benin, West Africa," *Remote Sensing* 6(7):6472-6499, 2014.

Fox et al., "Apparatus and Methods for a Synthetic Aperture Radar With Multi-Aperture Antenna," U.S. Appl. No. 62/510,182, filed May 23, 2017, 42 pages.

Fox et al., "Apparatus and Methods for a Synthetic Aperture Radar With Self-Cueing," U.S. Appl. No. 62/510,132, filed May 23, 2017, 39 pages.

Fox et al., "Range Ambiguity Suppression in Digital Multibeam," U.S. Appl. No. 62/590,153, filed Nov. 22, 2017, 19 pages.

Fox et al., "Synthetic Aperture Radar Imaging Apparatus and Methods for Moving Targets," U.S. Appl. No. 62/510,191, filed May 23, 2017, 24 pages.

Fox, "Apparatus and Methods for Quad-Polarized Synthetic Aperture Radar," U.S. Appl. No. 62/035,279, filed Aug. 8, 2014, 52 pages.

(56) References Cited

OTHER PUBLICATIONS

Fox, "Apparatus and Methods for Synthetic Aperture Radar With Digital Beamforming," U.S. Appl. No. 62/137,934, filed Mar. 25, 2015, 45 pages.

Fox, "Efficient Planar Phased Array Antenna Assembly," U.S. Appl. No. 62/180,421, filed Jun. 16, 2015, 33 pages.

Fox, "Synthetic Aperture Radar Imaging Apparatus and Methods," U.S. Appl. No. 62/260,063, filed Nov. 25, 2015, 41 pages.

Fox, "Synthetic Aperture Radar Imaging Apparatus and Methods," U.S. Appl. No. 62/510,123, filed May 23, 2017, 74 pages.

Freeman et al., "On the Detection of Faraday Rotation in Linearly Polarized L-Band SAR Backscatter Signatures," *IEEE Transactions on Geoscience and Remote Sensing* 42(8):1607-1616, Aug. 2004.

Freeman et al., "The "Myth" of the Minimum SAR Antenna Area Constraint," *IEEE Transactions on Geoscience and Remote Sensing* 38(1):320-324, Jan. 2000.

Giuli et al., "Radar target scattering matrix measurement through orthogonal signals," *IEE Proceedings Part F: Communications, Radar & Signal Processing* 140(4):233-242, 1993.

Hadjis, "Automatic Modulation Classification of Common Communication and Pulse Compression Radar Waveforms Using Cyclic Features," master's thesis, Air Force Institute of Technology, Wright-Patterson Air Force Base, Ohio, USA, Mar. 2013, 96 pages.

Heege et al., "Mapping of water depth, turbidity and sea state properties using multiple satellite sensors in aquatic systems," *Hydro 2010*, Rostock, Germany, Nov. 2-5, 2010, 27 pages.

Hoogeboom et al., "Integrated Observation Networks of the Future," *4th Forum on Global Monitoring for Environment and Security*, Baveno, Italy, Nov. 26-28, 2003, 14 pages.

Hossain et al., "Multi-Frequency Image Fusion Based on MIMO UWB OFDM Synthetic Aperture Radar," Chapter 3, in Miao (ed.), *New Advances in Image Fusion*, InTech, 2013, pp. 37-55. (21 pages).

Hounam et al., "A Technique for the Identification and Localization of SAR Targets Using Encoding Transponders," *IEEE Transactions on Geoscience and Remote Sensing* 39(1):3-7, Jan. 2001.

Huang et al., "Analog Beamforming and Digital Beamforming on Receive for Range Ambiguity Suppression in Spaceborne SAR," *International Journal of Antennas and Propagation* 2015:182080, Feb. 2015, (7 pages).

Huang et al., "ASTC-MIMO-TOPS Mode with Digital Beam-Forming in Elevation for High-Resolution Wide-Swath Imaging," *Remote Sensing* 7(3):2952-2970, 2015.

International Preliminary Report on Patentability and Written Opinion dated Nov. 26, 2019, for International Application No. PCT/US2018/033970, 12 pages.

International Preliminary Report on Patentability and Written Opinion dated Nov. 26, 2019, for International Application No. PCT/US2018/033971, 10 pages.

International Preliminary Report on Patentability and Written Opinion, dated Nov. 26, 2019, for International Application No. PCT/US2018/034144, 8 pages.

International Preliminary Report on Patentability and Written Opinion, dated Jun. 4, 2020, for International Application No. PCT/US2018/062353, 7 pages.

International Preliminary Report on Patentability, dated Dec. 19, 2017, for International Application No. PCT/US2016/037675, 8 pages.

International Preliminary Report on Patentability, dated Dec. 19, 2017, for International Application No. PCT/US2016/037681, 6 pages.

International Preliminary Report on Patentability, dated Feb. 14, 2017, for International Application No. PCT/US2015/043739, 10 pages.

International Preliminary Report on Patentability, dated Jun. 7, 2016, for International Application No. PCT/US2014/068642, 10 pages.

International Preliminary Report on Patentability, dated May 29, 2018, for International Application No. PCT/US2016/063630, 6 pages.

International Preliminary Report on Patentability, dated Sep. 26, 2017, for International Application No. PCT/US2016/022841, 7 pages.

International Preliminary Report on Patentability, dated Dec. 15, 2016, for International Application No. PCT/US2015/035628, 8 pages.

International Preliminary Report on Patentability, dated Dec. 19, 2017, for International Application No. PCT/US2016/037666, 6 pages.

International Preliminary Report on Patentability, dated Jun. 7, 2016, for International Application No. PCT/US2014/068645, 14 pages.

International Preliminary Report on Patentability, dated Nov. 26, 2019, for International Application No. PCT/US2018/034146, 6 pages.

International Search Report and Written Opinion dated Sep. 23, 2016, for International Application No. PCT/US2016/037681, 8 pages.

International Search Report and Written Opinion, dated Aug. 27, 2015, for International Application No. PCT/US2014/068642, 13 pages.

International Search Report and Written Opinion, dated Dec. 17, 2019, for International Application No. PCT/US2018/062353, 10 pages.

International Search Report and Written Opinion, dated Feb. 13, 2017, for International Application No. PCT/US2016/063630, 8 pages.

International Search Report and Written Opinion, dated Feb. 16, 2017, for International Application No. PCT/US2016/037675, 10 pages.

International Search Report and Written Opinion, dated Jun. 3, 2016, for International Application No. PCT/US2016/022841, 10 pages.

International Search Report and Written Opinion, dated Mar. 27, 2017, for International Application No. PCT/US2016/037666, 8 pages.

International Search Report and Written Opinion, dated Nov. 11, 2015, for International Application No. PCT/US2015/043739, 12 pages.

International Search Report and Written Opinion, dated Sep. 13, 2018, for International Application No. PCT/US2018/033970, 15 pages.

International Search Report and Written Opinion, dated Sep. 13, 2018, for International Application No. PCT/US2018/033971, 13 pages.

International Search Report and Written Opinion, dated Sep. 13, 2018, for International Application No. PCT/US2018/034144, 11 pages.

International Search Report and Written Opinion, dated Sep. 13, 2018, for International Application No. PCT/US2018/034146, 8 pages.

International Search Report and Written Opinion, dated Sep. 2, 2015, for International Application No. PCT/US2014/068645, 16 pages.

International Search Report and Written Opinion, dated Sep. 21, 2015, for International Application No. PCT/US2015/035628, 10 pages.

Kankaku et al., "The Overview of the L-band SAR Onboard ALOS-2," *Progress in Electromagnetics Research Symposium Proceedings*, Moscow, Russia, Aug. 18-21, 2009, pp. 735-738.

Kimura, "Calibration of Polarimetric PALSAR Imagery Affected by Faraday Rotation Using Polarization Orientation," *IEEE Transactions on Geoscience and Remote Sensing* 47(12):3943-3950, 2009.

Krieger et al., "CEBRAS: Cross Elevation Beam Range Ambiguity Suppression for High-Resolution Wide-Swath and MIMO-SAR Imaging," *International Geoscience and Remote Sensing Symposium*, Milan, Italy, Jul. 26-31, 2015, pp. 196-199.

Krieger et al., "Multidimensional Waveform Encoding: A New Digital Beamforming Technique for Synthetic Aperture Radar Remote Sensing," *IEEE Transactions on Geoscience and Remote Sensing* 46(1):31-46, 2008.

Larson et al., "Orbit Maintenance," *Space Mission Analysis and Design*, pp. 153-154, 177-189, 1997. (15 pages).

(56) References Cited

OTHER PUBLICATIONS

Linne von Berg et al., "Multi-Sensor Airborne Imagery Collection and Processing Onboard Small Unmanned Systems," *Proceedings of SPIE* 7668(1):766 807, 2010. (11 pages).
Linne von Berg, "Autonomous Networked Multi-Sensor Imaging Systems," *Imaging Systems and Applications*, Monterey, California, USA, Jun. 24-28, 2012, 2 pages.
Livingstone et al., "RADARSAT-2 System and Mode Description," *Systems Concepts and Integration Symposium*, Colorado Springs, Colorado, USA, Oct. 10-12, 2005, 22 pages.
Lombardo et al., "Monitoring and surveillance potentialities obtained by splitting the antenna of the COSMO-SkyMed SAR into multiple sub-apertures," *IEE Proceedings—Radar, Sonar and Navigation* 153(2):104-116, Apr. 2006.
Lopez et al., "Systems and Methods for Earth Observation," U.S. Appl. No. 61/911,914, filed Dec. 4, 2013, 177 pages.
Ma, "Application of RADARSAT-2 Polarimetric Data for Land Use and Land Cover Classification and Crop Monitoring in Southwestern Ontario," Master's Thesis, The University of Western Ontario, Canada, 2013, 145 pages.
Maciejewski et al., "Systems and Methods for Processing and Providing Video," U.S. Appl. No. 62/011,935, filed Jun. 13, 2014, 52 pages.
Makar et al., "Real-Time Video Streaming With Interactive Region-of-Interest," *Proceedings of 2010 IEEE 17th International Conference on Image Processing*, Hong Kong, China, Sep. 26-29, 2010, pp. 4437-4440.
Meilland et al., "A Unified Rolling Shutter and Motion Blur Model for 3D Visual Registration," *IEEE International Conference on Computer Vision*, Sydney, Australia, Dec. 1-8, 2013, pp. 2016-2023.
Meyer et al., "Prediction, Detection, and Correction of Faraday Rotation in Full-Polarimetric L-Band SAR Data," *IEEE Transactions on Geoscience and Remote Sensing* 46(10):3076-3086, 2008.
National Instruments, "Direct Digital Synthesis," white paper, Dec. 30, 2016, 5 pages.
Notice of Allowance dated Sep. 18, 2019, for U.S. Appl. No. 15/737,065, Peter Allen Fox et al., "Efficient Planar Phased Array Antenna Assembly," 9 pages.
Notice of Allowance, dated Mar. 9, 2017, for U.S. Appl. No. 15/101,344, Beckett et al., "Systems and Methods for Processing and Distribuung Earth Observation Images," 9 pages.
Notice of Allowance, dated Oct. 18, 2018, for U.S. Appl. No. 15/316,469, Maciejewski et al., "Systems and Methods for Processing and Providing Terrestrial and/or Space-Based Earth Observauon Video," 8 pages.
Office Action dated Oct. 18, 2019, for U.S. Appl. No. 15/737,016, George Tyc, "Systems and Methods for Remote Sensing of the Earth From Space," 18 pages.
Office Action dated Oct. 4, 2019, for U.S. Appl. No. 15/737,044, Keith Dennis Richard Beckett et al., "Systems and Methods for Enhancing Synthetic Aperture Radar Imagery," 14 pages.
Office Action, dated Apr. 23, 2018, for U.S. Appl. No. 15/316,469, Maciejewski et al., "Systems and Methods for Processing and Providing Terrestrial and/or Space-Based Earth Observation Video," 21 pages.
Office Action, dated Aug. 6, 2018, for U.S. Appl. No. 15/101,336, Lopez et al., "Systems and Methods for Earth Observation," 26 pages.
Office Action, dated Feb. 11, 2019, for U.S. Appl. No. 15/502,468, Fox, "Apparatus and Methods for Quad-Polarized Synthetic Aperiure Radar," 42 pages.
Office Action, dated Jan. 13, 2021, for Canadian Application No. 3,064,739, 4 pages.
Pleskachevsky et al., "Synergy and fusion of optical and synthetic aperture radar satellite data for underwater topography estimation in coastal areas," *Ocean Dynamics* 61(12):2099-2120, 2011.
Preliminary Amendment, filed Dec. 15, 2017, for U.S. Appl. No. 15/737,016, Tyc, "Systems and Methods for Remote Sensing of the Earth From Space," 11 pages.
Preliminary Amendment, filed Dec. 15, 2017, for U.S. Appl. No. 15/737,044, Beckett et al., "Systems and Methods for Enhancing Synthetic Aperture Radar Imagery," 10 pages.
Preliminary Amendment, filed Dec. 15, 2017, for U.S. Appl. No. 15/737,065, Fox et al., "Efficient Planar Phased Array Antenna Assembly," 8 pages.
Preliminary Amendment, filed Dec. 5, 2016, for U.S. Appl. No. 15/316,469, Maciejewski et al., "Systems and Methods for Processing and Providing Terrestrial and/or Space-Based Earth Observation Video," 9 pages.
Preliminary Amendment, filed Feb. 7, 2017, for U.S. Appl. No. 15/502,468, Fox, "Apparatus and Methods for Quad-Polarized Synthetic Aperture Radar," 12 pages.
Preliminary Amendment, filed Jun. 2, 2016, for U.S. Appl. No. 15/101,336, Lopez et al., "Systems and Methods for Earth Observation," 9 pages.
Preliminary Amendment, filed Jun. 2, 2016, for U.S. Appl. No. 15/101,344, Beckett et al., "Systems and Methods for Processing and Distributing Earth Observation Images," 11 pages.
Preliminary Amendment, filed May 22, 2018, for U.S. Appl. No. 15/778,188, Fox, "Synthetic Aperture Radar Imaging Apparatus and Methods," 9 pages.
Preliminary Amendment, filed Sep. 25, 2017, for U.S. Appl. No. 15/561,437, Fox, "Apparatus and Methods for Synthetic Aperture Radar With Digital Beamforming," 11 pages.
Raney, "Hybrid-Polarity SAR Architecture," *IEEE Transactions on Geoscience and Remote Sensing* 45(11):3397-3404, 2007.
Raouf et al., "Integrated Use of SAR and Optical Data for Coastal Zone Management," *Proceedings of the 3rd European Remote Sensing Symposium* vol. 2, Florence, Italy, Mar. 14-21, 1997, pp. 1089-1094.
Research Systems Inc., "ENVI Tutorials," ENVI Version 3.4, Sep. 2000, 590 pages.
Richardson, "By the Doppler's sharp stare," Oct. 1, 2003, *Armada International*, URL=https://www.thefreelibrary.com/_/print/PrintArticle.aspx?id=111508265, download date Oct. 8, 2018, 7 pages.
Rosen et al., "Techniques and Tools for Estimating Ionospheric Effects in Interferometric and Polarimetric SAR Data," *International Geoscience and Remote Sensing Symposium*, Vancouver, British Columbia, Canada, Jul. 24-29, 2011, pp. 1501-1504.
Rossler, "Adaptive Radar with Application to Joint Communication and Synthetic Aperture Radar (CoSAR)," doctoral dissertation, The Ohio State University, Columbus, Ohio, USA, 2013, 117 pages.
Rouse et al., "Swathbuckler Wide Area SAR Processing Front End," *IEEE Conference on Radar*, Verona, New York, USA, Apr. 24-27, 2006, 6 pages.
Rudolf, "Increase of Information by Polarimetric Radar Systems," Doctoral Dissertation, Institut für Höchstfrequenztechnik und Elektronik der Universität Karlsruhe, Karlsruhe, Germany, 2000, pp. 26-27. (5 pages).
Sakiotis et al., "Ferrites at Microwaves," *Proceedings of the IRE* 41(1):87-93, 1953.
Sano et al., "Synthetic Aperture Radar (L band) and Optical Vegetation Indices for Discriminating the Brazilian Savanna Physiognomies: A Comparative Analysis," *Earth Interactions* 9(15):5, 2005, (15 pages).
Souissi et al., "Investigation of the capability of the Compact Polarimetry mode to Reconstruct Full Polarimetry mode using RADARSAT2 data," *Advanced Electromagnetics* 1(1):19-28, May 2012.
Space Dynamics Laboratory, "RASAR: Real-time, Autonomous, Synthetic Aperture Radar," Fact Sheet, 2013, 2 pages.
Stofan et al., "Overview of Results of Spacebome Imaging Radar-C, X-Band Synthetic Aperture Radar (SIR-C/X-SAR)," *IEEE Transactions on Geoscience and Remote Sensing* 33(4):817-828, Jul. 1995.
Stralka, "Applications of Orthogonal Frequency-Division Multiplexing (OFDM) to Radar," doctoral dissertaion, Johns Hopkins University, Baltimore, Maryland, USA, Mar. 2008, 196 pages.
Tyc, "Systems and Methods for Remote Sensing of the Earth From Space," U.S. Appl. No. 62/180,440, filed Jun. 16, 2015, 29 pages.

(56) References Cited

OTHER PUBLICATIONS

Van Zyl et al., "Synthetic Aperture Radar Polarimetry," in Yuen (ed.), *JPL Space Science and Technology Series*, Jet Propulsion Laboratory, California Institute of Technology, 2010, 333 pages.
Wall et al., "User Guide to the Magellan Synthetic Aperture Radar Images," Jet Propulsion Laboratory, Pasadena, California, USA, Mar. 1995, 210 pages.
Walls et al., "Multi-Mission, Autonomous, Synthetic Aperture Radar," *Proceedings of SPIE*, vol. 9077: 907706-1-907706-14, 2014.
Werninghaus et al., "The TerraSAR-X Mission," *5th European Conference on Synthetic Aperture Radar*, Ulm, Germany, May 25-27, 2004, 4 pages.
Wolff, "Radar Basics—Exciter," URL=http://www.radartutorial.eu/08.transmitters/Exciter.en.html, download date Mar. 6, 2018, 2 pages.
Wright et al., "Faraday Rotation Effects on L-Band Spaceborne SAR Data," *IEEE Transactions on Geoscience and Remote Sensing* 41(12):2735-2744, Dec. 2003.
Wu et al., "Simultaneous transmit and receive polarimetric synthetic aperture radar based on digital beamforming," *4th International Conference on Mechatronics, Materials, Chemistry and Computer Engineering*, Xi'an, China, Dec. 12-13, 2015, pp. 1283-1288.
Xia et al., "Classification of High Resolution Optical and SAR Fusion Image Using Fuzzy Knowledge and Object-Oriented Paradigm," *Geographic Object-Based Image Analysis* vol. XXXVIII-4/C7, Ghent, Belgium, Jun. 29-Jul. 2, 2010, 5 pages.
Zhang et al., "OFDM Synthetic Aperture Radar Imaging With Sufficient Cyclic Prefix," *IEEE Transactions on Geoscience and Remote Sensing* 53(1):394-404, Jan. 2015.
Šindelář et al., "A Smartphone Application for Removing Handshake Blur and Compensating Rolling Shutter," *IEEE International Conference on Image Processing*, Paris, France, Oct. 27-30, 2014, pp. 2160-2162.
Šindelář et al., "Image deblurring in smartphone devices using built-in inertial measurement sensors," *Journal of Electronic Imaging* 22(1):011003, Feb. 2013. (22 pages).

\* cited by examiner

SYNTHETIC APERTURE RADAR APPARATUS AND METHODS

TECHNICAL FIELD

The present application relates generally to a synthetic aperture radar (SAR) and, more particularly, to a SAR providing Quad Polarization (Quad Pol) functionality.

BACKGROUND

Description of the Related Art

A synthetic aperture radar (SAR) is an imaging radar. The SAR exploits the relative motion of the radar and a target of interest to obtain high azimuthal resolution. The SAR is typically flown on an aircraft, a spacecraft, unmanned aerial vehicle (UAV) such as a drone, or another suitable platform. The target of interest is typically on the ground (e.g. on land, water, ice or snow), and can be a point target or a distributed target. The SAR can be a component of a SAR imaging system, the system also including at least one of data processing and data distribution components.

In conventional operation of a SAR imaging system, the system is tasked to obtain images of a target or a swath. Data is collected on-board the platform. In the case of a space-borne SAR, the data is collected on-board the spacecraft, and either processed on-board the spacecraft and downlinked to the ground, or downlinked and processed on the ground to generate the images. The images are distributed to the user, typically via a network. In some implementations, the main elements of a space-borne SAR platform can include:

Satellite Platform: includes the following subsystems and units: Structure, Power, On-board Data Handling, a Payload Data Handling Unit, Telemetry and Telecommands;

Communications (TT&C), X-Band High-rate Downlink, Attitude and Orbit Control subsystem, Thermal Control, and Propulsion;

SAR Instrument; and/or

A SAR Processing Unit: performs onboard SAR data processing.

A single frequency SAR generates images of the terrain by transmitting radar pulses in a frequency band centered on a single frequency. For example, in the case of the RADARSAT-2 SAR, the center frequency was 5.405 GHz.

Having SAR images acquired at the same time at different frequency bands can be beneficial for remote sensing of the terrain. For example, longer wavelengths (such as L-band) propagate better through vegetation and can provide backscatter from stems or branches, or from the ground below. Shorter wavelengths (such as X-band) tend to provide more backscatter from the canopy. Simultaneous acquisition of SAR images at more than one frequency of illumination (for example, at L-band and X-band) can provide a more complete understanding of the terrain than acquisition of images at a single band.

It can also be desirable for the SAR to be capable of imaging at different polarizations (for example, single polarization and quad polarization), and in different operational modes such as ScanSAR and spotlight SAR.

BRIEF SUMMARY

Some embodiments of SAR systems can incorporate the following advanced SAR features into a single SAR instrument:

a shared aperture;

multi-aperture (e.g., in one implementation, six apertures for a SAR operating at X-band, three apertures for a SAR operating at L-band);

digital beam-forming (with multiple beams in elevation and azimuth);

quad-polarization and compact polarization; and/or modular multi-aperture technology with digital interfaces of SAR Data.

In the case of a dual-band SAR, the SAR can have simultaneous dual-frequency capability (e.g., L-band and X-band).

SAR systems can include multiple digital and RF components. In some implementations, a SAR system includes a SAR antenna, sensor electronics, and Transmit Receive Modules (TRMs) mounted on an antenna panel.

A SAR Processing Unit (SPU) can be part of an On-Board Data Handling subsystem. The SPU may house processing boards, power boards, cabling, and an associated backplane. Each processing board in the SPU can include multiple ultra-high performance FPGA boards, for example, that can perform real-time processing tasks. The processing functions performed by the SPU can include the following:

on-board SAR Data Processing;

target detection; and/or compression/packetization/encryption/forward error correction encoding for communications links.

In an embodiment, a method of operation of a synthetic aperture radar (SAR) system comprising at least one SAR antenna, at least one SAR processor and at least one SAR transceiver, includes: defining a first beam to illuminate a first swath using the at least one SAR antenna; defining a second beam to illuminate a first area of ambiguity associated with the first beam; transmitting a pulse via the first beam and receiving backscatter energy; generating, by the at least one SAR processor based on the received backscatter energy, a first signal associated with the first beam and a second signal associated with the second beam; combining the second signal with a first determined complex vector, generating a first ambiguity signal; and combining the first signal with the first ambiguity signal, generating an image signal associated with the first swath. In an embodiment, the method includes defining a third beam to illuminate a second area of ambiguity associated with the first beam; generating, by the at least one SAR processor based on the received backscatter energy, a third signal associated with the third beam; combining the third signal with a second determined complex vector, generating a second ambiguity signal; and combining the first signal with the first ambiguity signal and the second ambiguity signal, generating the image signal associated with the first swath.

In an embodiment, a method of operation of a synthetic aperture radar (SAR) system comprising at least one SAR antenna, at least one SAR processor and at least one SAR transceiver, includes: defining a first beam to illuminate a first swath using the at least one SAR antenna; defining a plurality of second beams to illuminate respective areas of ambiguity associated with the first beam; transmitting a pulse via the first beam and receiving backscatter energy; generating, by the at least one SAR processor and based on the backscatter energy, a first signal associated with the first beam and a plurality of second signals associated with respective beams of the plurality of second beams; combining the signals of the plurality of second signals with respective determined complex vectors, generating a plurality of ambiguity signals; and combining the first signal with the plurality of ambiguity signals, generating an image signal associated with the first swath. In an embodiment, a determined complex vector represents a ratio of a complex sensitive of the first beam to a complex sensitivity of a beam illuminating an area of ambiguity associated with the first beam. In an embodiment, the beams are multiple simultaneous elevation beams. In an embodiment, the beams are formed from an aperture. In an embodiment, the method includes operating the SAR in a Quad-Pol mode. In an embodiment, defining a beam to illuminate an area of ambiguity associated with the first beam comprises directing the beam based on one or more of: a beam center offset; or beam pattern shaping. In an embodiment, the method includes directing beams at non-sequential areas of ambiguity associated with the first beam. In an embodiment, the combining the first signal with an ambiguity signal at least partially cancels ambiguous energy present in the first signal. In an embodiment, the combining the first signal with an ambiguity signal comprises applying linear algebra. In an embodiment, the combining the first signal with an ambiguity signal comprises subtracting the ambiguity signal from the first signal. In an embodiment, the SAR comprises multiple overlapping or non-overlapping azimuth apertures and the method comprises using azimuth modulation. In an embodiment, the method includes using alternating up/down chirp modulation. In an embodiment, the method includes using a multi-polarization mode with 5 beams receiving backscatter energy at each polarization. In an embodiment, the SAR operates in an L-band. In an embodiment, the method includes estimating a calibration error associated with a ratio of complex sensitive and compensating for the calibration error. In an embodiment, the ambiguity is a range ambiguity located on a main lobe of the first beam. In an embodiment, the range ambiguities are measured on backscatter of the pulse transmitted on the first beam.

In an embodiment, a synthetic aperture radar (SAR) system includes at least one SAR antenna, at least one SAR processor and at least one SAR transceiver, and the SAR system is operable to perform any of the methods disclosed herein. In an embodiment, the at least one SAR antenna, the at least one SAR processor and the at least one SAR transceiver are co-located on a spaceborne or airborne SAR platform. In an embodiment, the spaceborne SAR platform is a free-flying spacecraft.

BRIEF DESCRIPTION OF THE SEVERAL VIEWS OF THE DRAWINGS

In the drawings, identical reference numbers identify similar elements or acts unless the context indicates otherwise. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
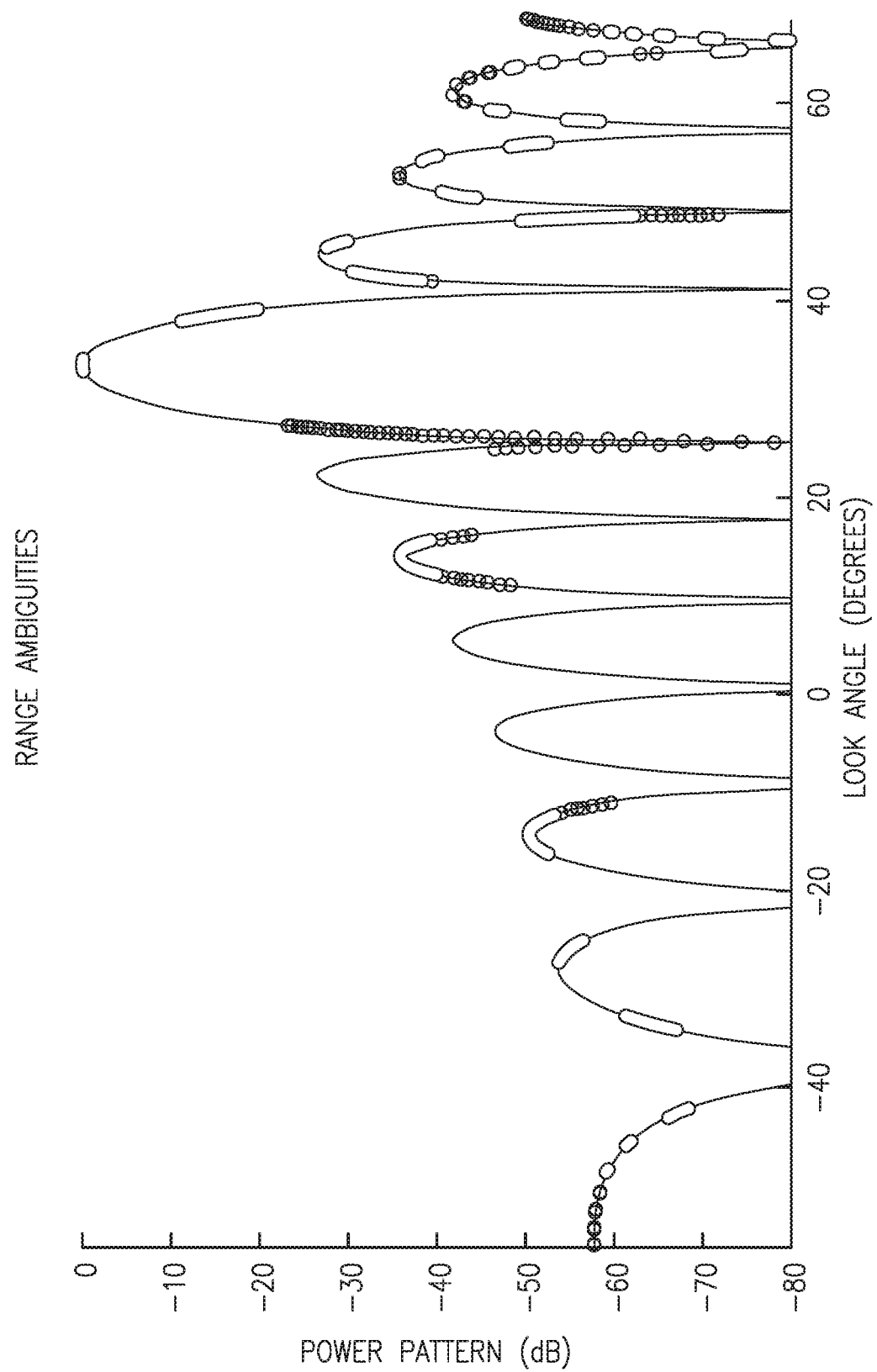
FIG. 1 is a graph illustrating example range ambiguity positions and levels.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one implementation" or "an implementation" or "one embodiment" or "an embodiment" means that a particular feature, structure or characteristic described in connection with the implementation or embodiment is included in at least one implementation or at least one embodiment. Thus, the appearances of the phrases "one implementation" or "an implementation" or "in one embodiment" or "in an embodiment" in various places throughout this specification are not necessarily all referring to the same implementation or the same embodiment. Furthermore, the particular features, structures, or characteristics may be combined in any suitable manner in one or more implementations or one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The Abstract of the Disclosure provided herein is for convenience only and does not interpret the scope or meaning of the embodiments.

As used herein, and in the claims, cueing means the scheduling and commanding of an activity such as the pointing of a remote sensing instrument (such as a SAR) and/or acquisition of data using the remote sensing instrument.

As used herein, and in the claims, self-cueing means the cueing of a remote sensing instrument in response to information derived from data previously acquired by the same remote sensing instrument.

As used herein, and in the claims, pre-steered beam means a steered beam of an antenna for which the value of the steering angle depends at least in part on fixed or permanent elements introduced during manufacture of the antenna that cause the beam to be steered to a selected angle.

Synthetic aperture radars suffer from the problem of range ambiguities. High range ambiguities are an issue in all radars and may be solved by delaying transmission of a second pulse until all returns from the first pulse have died out. However, this solution may be impractical, for example, in a space-based SAR.

In space-based SAR the ambiguity problem is complicated by the long range to the ground. The SAR is be sampled in azimuth at a rate somewhat larger than the azimuth Doppler bandwidth. Azimuth Doppler bandwidth can be reduced by increasing the azimuth dimension (along track) of the physical antenna aperture. Decreasing the azimuth sampling rate, that is, the pulse repetition frequency (PRF), increases the spacing between the range ambiguities, and the range ambiguity level is decreased as the ambiguities move further away from the peak of the antenna. Unfortunately, the reduction in azimuth Doppler bandwidth results in poor azimuth resolution. Similarly, the reduction in PRF has the potential to increase azimuth ambiguities.

In FIG. 1, we see the range ambiguity positions and levels for a PRF of 3500 Hz (L-Band 6 m×1.8 m array). The shaded portions of the curves represent ambiguous signals, with the exception of the shaded portion on the peak of the main beam, which is the part of the beam pattern that is used for imaging. As illustrated, the peak ambiguity levels are well above −20 dB.

Increasing the PRF results in increased range ambiguities, since the ambiguities move closer to the main lobe of the antenna (in elevation). Note in FIG. 1 that the +1 and −1 ambiguities (immediately to the right and left, respectively, of the main beam) are on the main beam itself. This is typical behavior when the PRF has been forced to a higher frequency due to quad-pol and a broad elevation beam. It is difficult to reduce these ambiguities by manipulating the beam pattern because the main beam elevation roll-off rate is determined by the height of the real aperture. If the physical aperture of the antenna in elevation can be increased, then the main lobe would become narrower and these ambiguities would remain in the same angular position but would be reduced in strength. However, the physical size of the antenna is a powerful cost driver of the entire SAR system, and thus, a larger antenna may not always be a feasible solution.

The problem of range ambiguities may be greatly exacerbated by lower frequency SARs. For example, an L-band SAR has a beam pattern that is 8 times wider than an X-band SAR of the same physical dimensions. Note that SAR is of unparalleled utility in global biomass and biosphere studies, and the quality of the scientific data is greatly enhanced by using lower frequencies and using quad-pol. Thus, the problem of high range ambiguities is of significant importance in such studies.

The classic method for controlling range (and azimuth) ambiguities is to use a large antenna (large area) or a multi-aperture antenna. An embodiment provides algorithms and technologies to facilitate reducing range ambiguities and enabling smaller satellites platforms to deliver high quality products providing polarization functionality.

Most spaceborne SAR antennas are very large, with a range from 9 to 15 m being typical for the antenna length (along track dimension). For example, RADARSAT-2 has an antenna that is 15 m long; ALOS-2 has an antenna of 9.9 m; and Tandem-L has a proposed 15 m diameter SAR antenna.

Spaceborne SARs are thus some of the largest structures flown in space. Spaceborne SARs employ complex deployment mechanisms, and even when the antenna is stowed for launch, the mass of the large antenna needs to be tied down and supported by a large bus. The result is that the launch requires a large launch vehicle.

It is possible to make smaller SARs with acceptable performance. Example compromises of doing so are discussed in A. Freeman et al., *The "Myth" of the Minimum SAR Antenna Area Constraint*, Geosci. and Remote Sensing, 38 (2000), in which it is shown that smaller SAR antennas are practicable and offer the SAR system designer a greater degree of freedom in system design. The ability to use smaller SAR systems rests on three insights into spaceborne SAR design that have each been implemented successful.

The three insights are:
selection of a pulse repetition frequency (PRF) smaller than the nominal Doppler bandwidth;
adoption of a smaller processing bandwidth;
limiting the appearance of range ambiguities by the selection of a data-window size in a range that is less than the illuminated swath.

However, when quad-pol functionality (and performance) is desired, then the first of these insights is violated, and the PRF has to be doubled. As a consequence of this, range ambiguities become a problem once again, which conventionally is addressed by employing larger antennas or multiple apertures.

Conventional quad-pol SARs, (see, e.g., Werninghaus et al., *The TerraSAR-X Mission*, Proceedings of EUSAR 2004 (May 2004), Lombardo et al., *Monitoring and surveillance potentialities obtained by splitting the antenna of the COSMO-SkyMed SAR into multiple sub-aperture*, IEEE Proceedings on Radar, Sonar and Navigation, 153 (2) (2006)) operate with interleaved transmission of alternate H- and V-polarized pulses, receiving both H- and V-polarizations to build up a measurement of the full scattering matrix for each pixel on the ground.

In quad-pol mode, the SAR designer typically adopts an overall PRF that is twice as high as for conventional non-quad-pol modes of operation, interleaving H and V transmit pulses, and receiving both H and V-polarized returns for each. One limitation to such systems has been the presence of strong like-polarized (HH or VV) range ambiguities arriving at the same time as cross-polarized (HV or VH) returns from the desired imaged swath. These ambiguities tend to severely restrict the range of incidence angles and swaths for quad-pol systems.

Consider the following equation (Eq. 1) for the total measured scattering matrix M of the imaged swath, $$\begin{pmatrix} M_{HH} & M_{HV} \\ M_{VH} & M_{VV} \end{pmatrix} \cong \begin{pmatrix} S_{HH} & S_{HV} \\ S_{VH} & S_{VV} \end{pmatrix} + \sum_{i=odd} RAR_i \begin{pmatrix} \hat{S}_{HV_i} & \hat{S}_{HH_i} \\ \hat{S}_{VV_i} & \hat{S}_{VH_i} \end{pmatrix} + \sum_{i=even} RAR_i \begin{pmatrix} \hat{S}_{HH_i} & \hat{S}_{HV_i} \\ \hat{S}_{VH_i} & \hat{S}_{VV_i} \end{pmatrix} \quad \text{(Eq. 1)}$$

where the subscript notation $X_{P_1 P_2}$ is used with $P_1$ denoting the receive (RX) polarization and $P_2$ denoting the transmit (TX) polarization. Note that Eq. 1 is derived from Raney et al., *Improved Range Ambiguity Performance in Quad-Pol SAR*, IEEE Trans. Geosci. And Remote Sensing, 50 (2) (2102), (mutatus mutandis). In the above notation, the first column of the M matrix is captured with a horizontally polarized transmit pulse and the second column is captured with a vertically polarized transmit pulse.

The first term on the right-hand side represents the actual scattering matrix of the desired swath. The remaining two terms in Eq. 1 represent range ambiguities, where we use the '^' to denote range ambiguous returns. The odd values of i are due to the orthogonal transmit polarization, and the even values of i are due to the same polarization on transmit. Note that the columns of the scattering matrix in the odd-valued range ambiguities are swapped because they arise from alternately transmitted pulses of the opposite polarization.

The main consequence of the second term in Eq. 1 is that because of the higher PRF introduced by interleaving transmit pulses, HV and VH returns of the S matrix are dominated by co-pol ambiguities from the Ŝ odd ambiguity matrix. These co-pol ambiguities may be 4-10 dB higher than the cross-pol terms in the S matrix. Thus, the very parameter that we are trying to measure, that is, the cross-pol terms of the S matrix, are the worst affected.

The co-pol terms of the S matrix are less affected, as they are higher than the ambiguous signal from the cross-pol terms.

In general, notwithstanding the effect of incidence angle, the first ambiguities are the strongest and thus, by the above discussion, are the worst contaminants of co-pol ambiguous energy into the desired cross-pol measurement.

In order to reduce range ambiguities, the ALOS-2 PALSAR-2 system has an ability to send alternating up/down chirp signals. One of the new techniques of ALOS-2 is the chirp modulation, which is used to decrease the influence of point target range ambiguities. ALOS-2 uses up/down chirp signals alternately transmitted with phase modulation (0 or $\pi$ radians), while PALSAR only uses a down linear chirp.

Consider the following explanation of pulse-to-pulse phase modulation (from A. Doerry, *SAR Ambiguous Range Suppression*, Sandia National Laboratories Report, SAND2006-5332 (2006)):

Doppler radar systems such as SAR allow a degree of freedom to separate the desired echo from an undesired ambiguous range echo. A pulse-to-pulse phase modulation can be employed to shift echoes from an undesired range to regions of the Doppler spectrum that facilitate their attenuation by conventional digital filtering techniques. Since the desired range is known, as is its pulse phase modulation, these can be accommodated in a manner so as to have no negative effect for the desired range echo.

Consequently, the desired range is separated in Doppler space from the undesired ambiguous range. This allows the undesired ambiguous range to be suppressed without affecting the desired range echo.

However, this technique pushes the ambiguous energy into specific areas of the Doppler spectrum with the result that the azimuth Doppler spectrum can no longer be used to achieve maximum azimuth resolution.

Figures 2A, 2B, 2C, 2D:
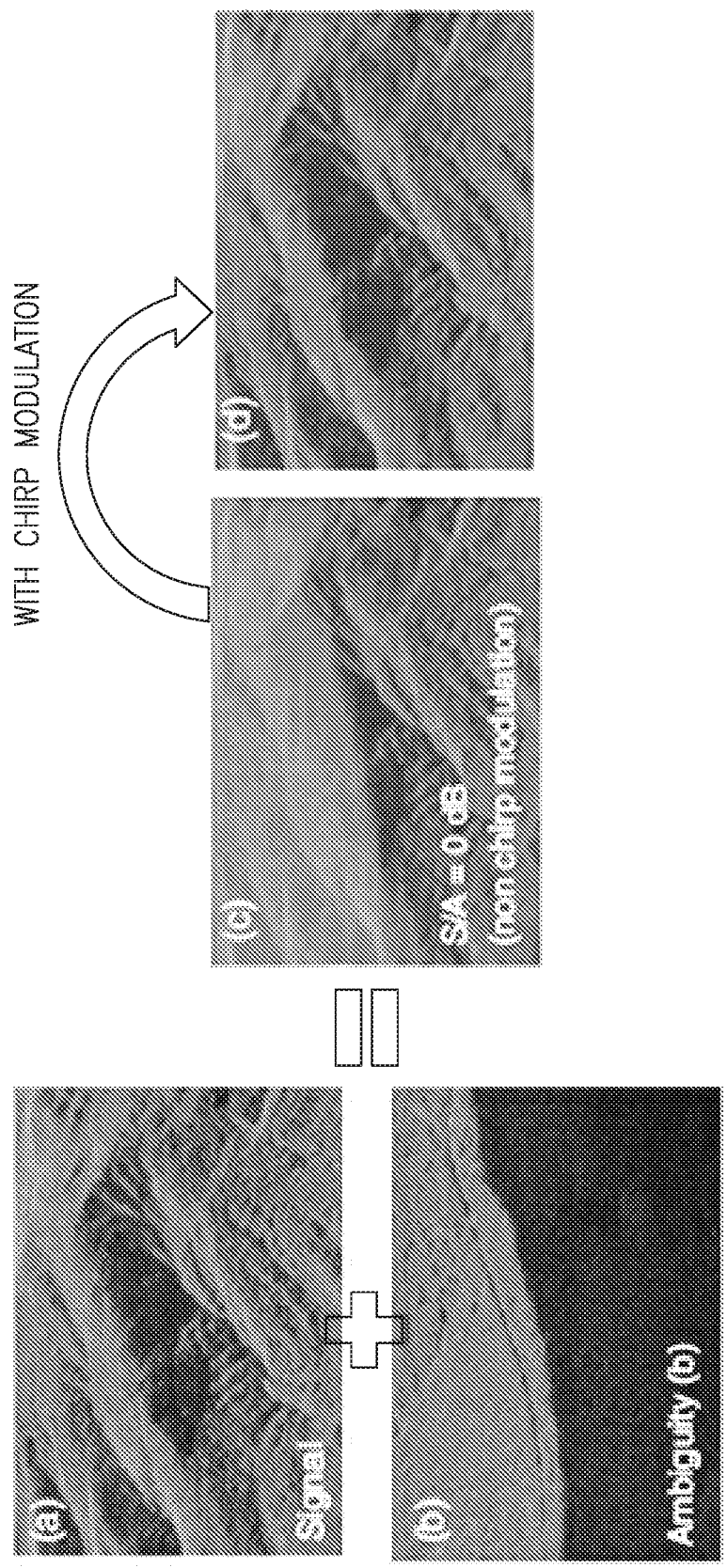
FIGS. 2A-2D illustrate a simulation result of alternating up/down chirps.
Figure 3:
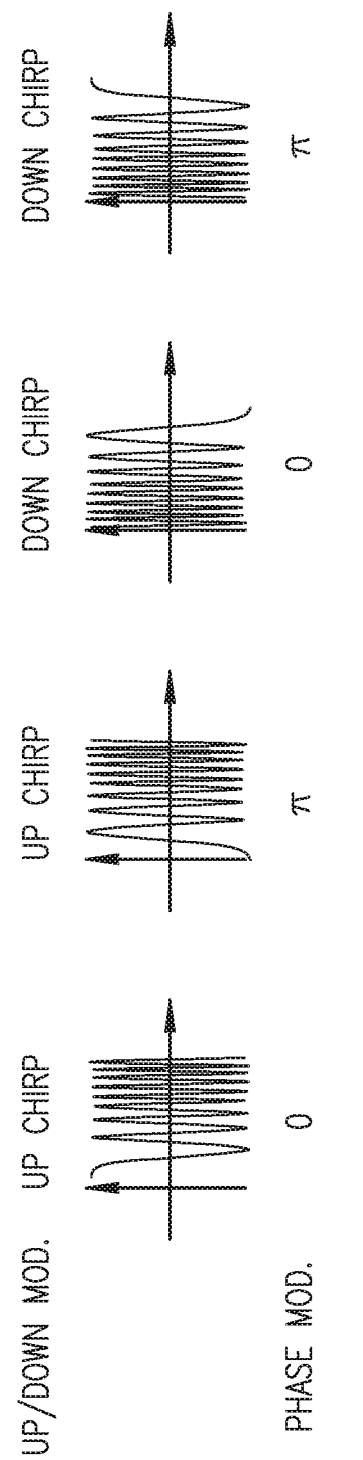
FIG. 3 shows an example modulation signal applied in the simulation of FIG. 2.

The Japanese Aerospace Exploration Agency (JAXA) has experimentally confirmed that the range ambiguity improved about 10 dB compared to results without any chirp or phase modulation. See Y. Kankaku et al., *The overview of the L-band SAR onboard ALOS*-2, Progress In Electromagnetics Research Symposium Proceedings (August 2009). FIG. 2 shows the simulation result of alternating up/down chirps. FIG. 3 shows the modulation signal applied in FIG. 2. FIG. 2(*a*) illustrates the main signal and FIG. 2(*b*) illustrates the ambiguity signal. The simulation area is TOMAKOMAI and the data is Pi-SAR data, which is the airborne L-band SAR. FIG. 2(*c*) illustrates where the signals of FIG. 2(*a*) and FIG. 2(*b*) were matched, when the main signal level is equal to the ambiguity. Using modulation, the ambiguity that exists in FIG. 2(*c*) has disappeared in FIG. 2(*d*). In a simulation study using Pi-SAR-L2, JAXA indicates that ALOS-2 will achieve an improvement of ambiguity ratios in range and azimuth by adopting alternate up-down chirping with periodic $\pi$-shift in the transmission code.

An embodiment exploits the ability of a digital beamformer to form multiple simultaneous beams from a same radar dataset (sampled amplitudes and phases) derived from the receive channels of the SAR. The digital beamformer has the ability to form a plurality of beams that may be specifically pointed at the sources of the dominant ambiguities. In this manner, the ambiguity signals can be measured directly with the highest possible signal to noise ratio. After correcting for deterministic amplitude and phase variations within and between the antenna beams, the measured ambiguities may be digitally removed from the main imaging beam signal.

Electromagnetic waves and the signal derived from the waves are spatially and temporally varying complex vectors. When the signals are added at the feed of an antenna, or within the beamformer of a phased array, the signals are treated as vectors, whether the beamformer is a passive summing device with phase shifters, or a post ADC weighted complex matrix summation with complex weights. When these signals propagate to the antenna from a plurality of scattering areas (point or distributed), the signals add as complex amplitude vectors at the antenna.

The inventors have recognized that the signals received by the beams pointed substantially away (in the case of the imaging beam), or substantially towards (as in the case of a deliberately introduced digitally beamformed beam designed for the purpose of interrogating the ambiguity) the sources of the ambiguities are the same except for an amplitude and phase term. These amplitude and phase terms may be introduced by the fact that the antenna is forming a multiplicity of beams or by amplitude and phase errors in the receive paths.

There is no need to deliberately introduce a phase offset from pulse-to-pulse. The pulse envelope and phase are determined by the antenna, as are the errors associated with them. However, there is thermal noise. This noise gives rise to noise equivalent sigma zero (NESZ) values, which are statistically independent between the digitally formed beams when they are steered relative to each other such that the beams are orthogonal, for example, when the nulls of one beam angularly correspond to the peaks of the other beam. Some statistical correlation occurs when the beams are steered very close to each other, as discussed in more detail below.

Figure 4:
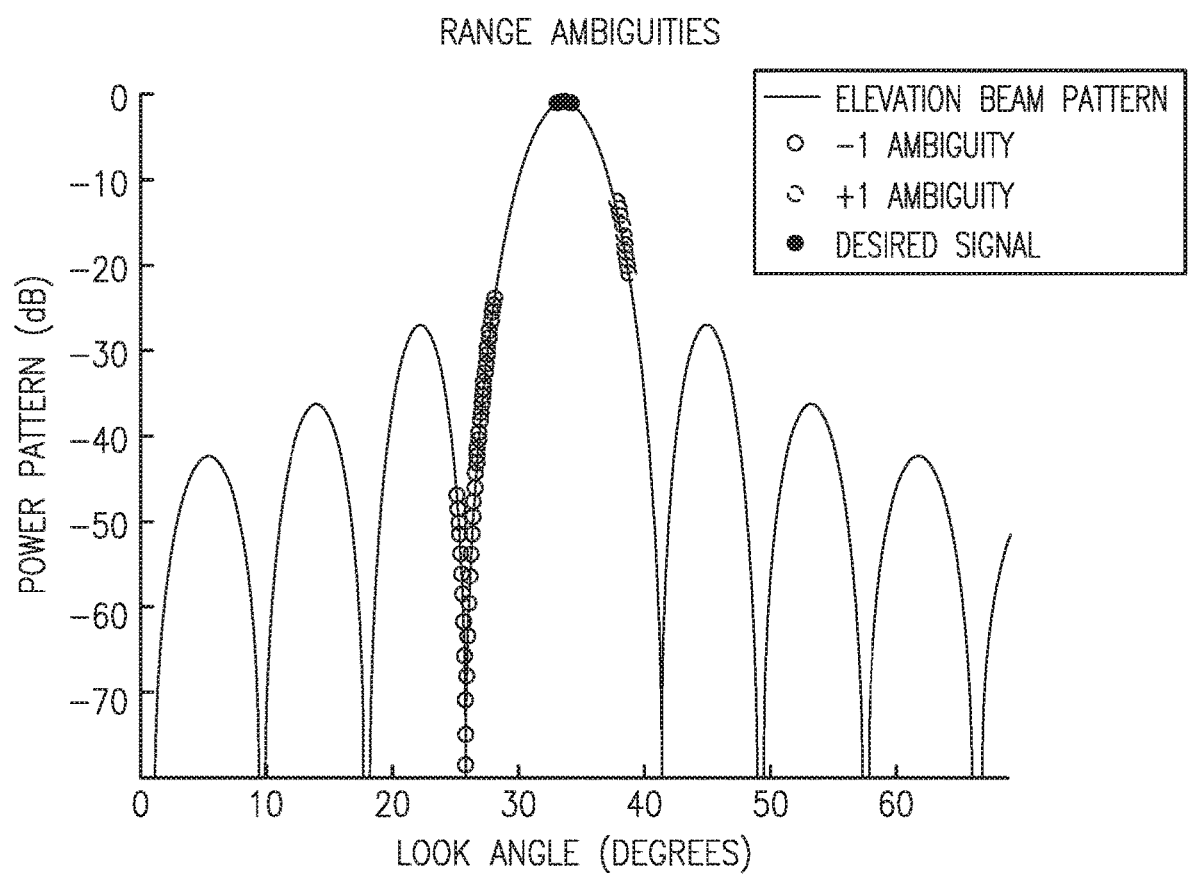
FIG. 4 is a graph illustrating example range ambiguity positions and levels.

In a small radar, small apertures require higher PRFs and range ambiguities may become too large, even at intermediate incidence angles. In certain extreme cases the range ambiguities may rise up on the antenna main lobe, as shown in FIG. 4.

An embodiment uses multiple receive beams in elevation. A plurality of beams may be formed from the digital data collected from the phased array elements in elevation. One beam (e.g., the main beam) is used for imaging the swath of interest. The other beams are directed at the dominant range ambiguities (in FIGS. 6A, 6B, 7A and 7B, discussed in more detail below, these are the +1 and −1 ambiguities).

The main beam produces a signal that is the sum of the swath of interest and the range ambiguous returns. Having measured the range ambiguous returns directly using the other digitally formed beams, the majority of the ambiguous signal may be removed from the main beam.

Figure 5A:
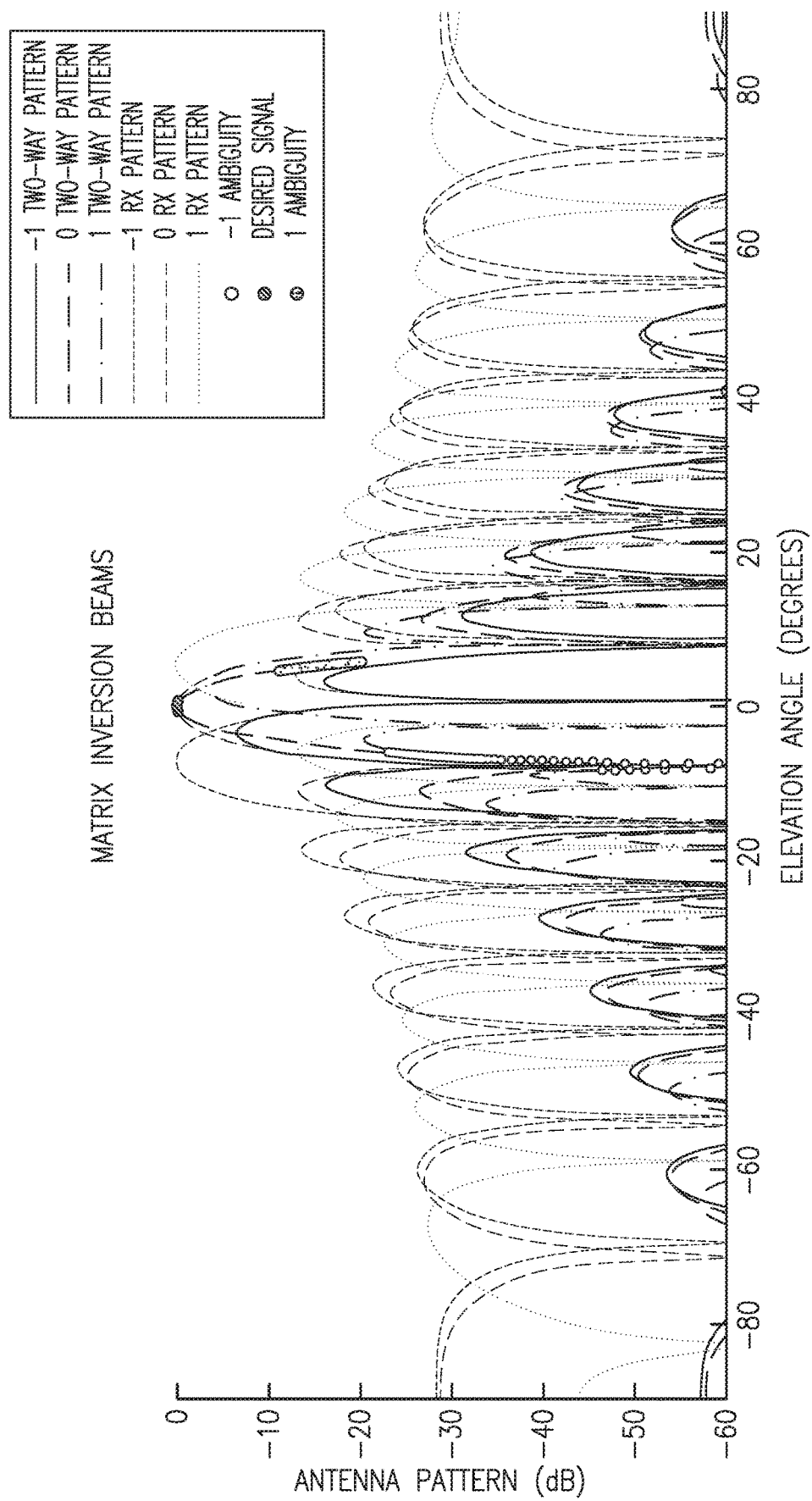
FIGS. 5A and 5B are black and white and color graphs illustrating example two-way beam patterns and ambiguous two-way beam patterns of an embodiment.
Figure 5B:
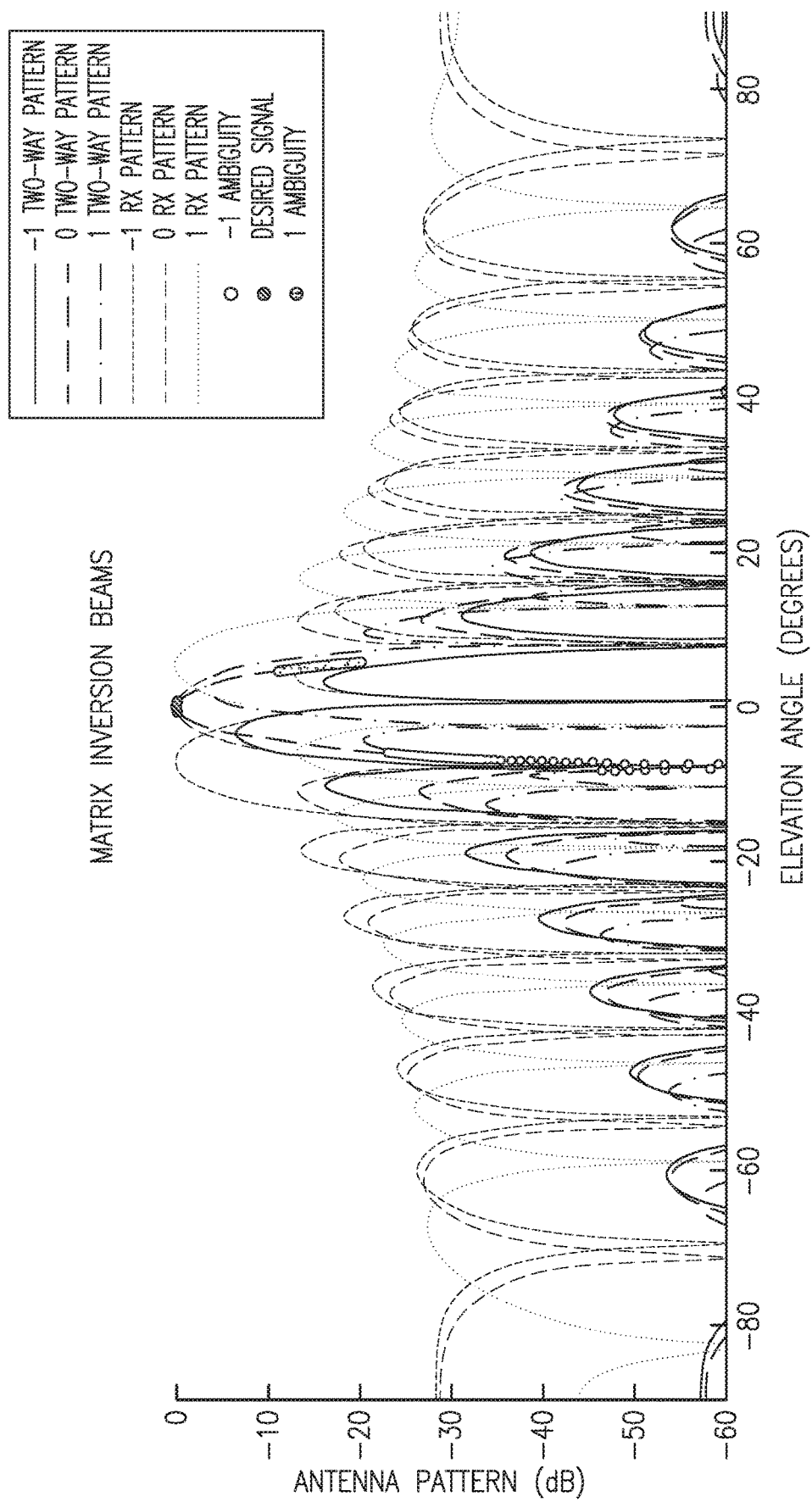

FIGS. 5A and 5B illustrate an embodiment of two-way beam patterns and the ambiguous two-way beam patterns (transmit and receive). The +1 elevation beam is steered specifically to measure the +1 range ambiguity. Similarly, the −1 elevation beam is steered specifically to measure the −1 range ambiguity.

As illustrated in FIGS. 5A and 5B, the worst case range ambiguity on the main imaging beam is approximately at −10 dB. This corresponds to the first range sample. The +1 elevation beam is pointed substantially towards the +1 ambiguity and thus, measures a larger "ambiguous signal."

The signal in the main beam and the signal in the +1 elevation beam are the same in all respects other than the amplitude and phases that are deterministically introduced by the beamforming system.

To remove the first ambiguity from the main beam, for each range sample, the determined ratio of the complex sensitivity of the main beam to the complex sensitivity to the +1 elevation beam is employed. Inverting that complex determined ratio provides a factor that, when multiplied by the ambiguous signal (as measured in the +1 elevation beam), produces a signal that closely represents the ambiguous signal as measured in the main beam. In this manner, one of the ambiguous components present in the main beam signal may be estimated.

Continuing with this example (limited to just the main beam and the +1 elevation beam), a complex vector of the same length as the number of range samples is formed. The elements of this complex vector are the determined ratio of the complex sensitivity of the main beam to the complex sensitivity to the +1 elevation beam. Inverting this, element by element, produces a complex vector that, when multiplied by the range sampled +1 ambiguity produces a signal that closely represents the entire range sampled +1 ambiguity present in the main beam.

This complex vector that is used to estimate the ambiguous signal in the main beam is of a deterministic shape governed by the transmit and receive patterns of the main beam in the area of the ambiguous scatterer, and the transmit and receive patterns of the +1 ambiguity interrogation beam in the area of the same ambiguous scatterer. If the antenna patterns are perfectly calibrated, then the +1 ambiguity scaled by this complex vector provides us with the components of the main beam range samples that result from that +1 ambiguity.

The same process may be applied to the −1 ambiguity in the example depicted in FIGS. 5A and 5B. This reasoning may be extrapolated to any number of ambiguities.

In the event that any pattern has a calibration error, the technique will result in a similar error in the estimation and removal of the ambiguous signal component within the main beam. Thus, this would result in a sub-optimal cancelation of the ambiguity from the main beam signal.

Correlation techniques may be applied to estimate any potential calibration error. The estimated calibration error may be employed to optimize the removal of the ambiguous signal in the presence of such calibration errors. It is typical that the largest ambiguities are located on the sides of the main lobe as discussed earlier. This is the easiest part of the beam to calibrate accurately.

In the process of measuring the +1 ambiguity with the +1 beam, an ambiguity from the main beam scatterer position is also acquired. This, say "−1 ambiguity" (as it falls immediately to the left of the interrogation beam peak) may be reduced in a two-fold process. Firstly, this "−1 ambiguity" is not on the peak of the +1 interrogation beam and is thus, a number of dBs down. Secondly, this "−1 ambiguity" may be reduced during the scaling using the deterministic vector derived from the ratio of beam patterns. The net result is that this ambiguity is significantly reduced.

This process may be extended to multiple ambiguities and multiple beams.

In terms of noise, the noise floor in the +1 beam is also added to the main beam, but has little impact since it is reduced by the same scaling vector. For example, if the worst-case ambiguity was at −6 dB on the main lobe of the main beam and at 0 dB on the +1 interrogation beam, then the entire signal (including noise) may be reduced by 6 dB prior to correction. The net result is adding to an existing noise floor an additional noise component, which in this worst-case scenario, is 6 dB lower. There are two extreme cases to be dealt with. In the one case, when the ambiguities are very close to the boresight of the main beam, these two noise components will be somewhat correlated and add linearly, $$10 \log_{10}(\sqrt{1}+\sqrt{0.25})^2 = 3.5 \text{ dB}$$

In the other extreme, the interrogation beam of the +1 ambiguity may be far enough away that there is very little correlation between these two noise components and they are added as powers, $$10 \log_{10}(1+0.25) = 1 \text{ dB}$$

If the NESZ on the main beam signal is a dB, then the NESZ resulting from the proposed method is at worst a +3.5 dB.

At a single range sample, the signal received from the main beam directed at the desired target is $$S_0 = \frac{\sigma_0(\beta_0) D_{TX}(\theta_0 + \varepsilon_0) D_{RX_0}(\theta_0 + \varepsilon_0)}{R_0^3 \sin(\beta_0)} + \qquad \text{(Eq. 1)}$$
$$\frac{\sigma_0(\beta_1) D_{TX}(\theta_1 + \varepsilon_0) D_{RX_0}(\theta_1 + \varepsilon_0)}{R_1^3 \sin(\beta_1)} +$$
$$\frac{\sigma_0(\beta_{-1}) D_{TX}(\theta_{-1} + \varepsilon_0) D_{RX_0}(\theta_{-1} + \varepsilon_0)}{R_{-1}^3 \sin(\beta_{-1})} +$$
$$\frac{\sigma_0(\beta_2) D_{TX}(\theta_2 + \varepsilon_0) D_{RX_0}(\theta_2 + \varepsilon_0)}{R_2^3 \sin(\beta_2)} +$$
$$\frac{\sigma_0(\beta_{-2}) D_{TX}(\theta_{-2} + \varepsilon_0) D_{RX_0}(\theta_{-2} + \varepsilon_0)}{R_{-2}^3 \sin(\beta_{-2})} + \ldots$$

The first term in Eq. 2 represents the main beam response of the unambiguous signal, and the remaining terms represent the ambiguous signals from the +1 and −1 ambiguities and the +2 and −2 ambiguities. Equation 2 is extended to include the higher order ambiguities. $R_0$ is the slant range to the unambiguous target. $R_1$ and $R_{-1}$ are the ranges to the ambiguous targets are defined as $$R_1 = R_0 + \frac{c}{2f_p} \qquad \text{(Eq. 3)}$$

and $$R_{-1} = R_0 - \frac{c}{2f_p} \qquad \text{(Eq. 4)}$$

where $\beta_i$ is the incidence angle of the $i^{th}$ range ambiguity, $\varepsilon_n$ is the error in the $n^{th}$ receive beam pointing, and $\theta_i$ is the angle off boresight.

Similarly, for the same range sample, the received signal from the receive beam directed at the +1 ambiguity is given by $$S_1 = \frac{\sigma_0(\beta_1) D_{TX}(\theta_1 + \varepsilon_0) D_{RX_1}(\theta_1 + \varepsilon_1)}{R_1^3 \sin(\beta_1)} + \qquad \text{(Eq. 2)}$$
$$\frac{\sigma_0(\beta_2) D_{TX}(\theta_2 + \varepsilon_0) D_{RX_1}(\theta_2 + \varepsilon_1)}{R_2^3 \sin(\beta_2)} +$$
$$\frac{\sigma_0(\beta_0) D_{TX}(\theta_0 + \varepsilon_0) D_{RX_1}(\theta_0 + \varepsilon_1)}{R_0^3 \sin(\beta_0)} +$$

-continued $$+ \frac{\sigma_0(\beta_{-1})D_{TX}(\theta_{-1}+\varepsilon_0)D_{RX_1}(\theta_{-1}+\varepsilon_1)}{R_{-1}^3 \sin(\beta_{-1})} +$$

$$\frac{\sigma_0(\beta_{-2})D_{TX}(\theta_{-2}+\varepsilon_0)D_{RX_1}(\theta_{-2}+\varepsilon_1)}{R_{-2}^3 \sin(\beta_{-2})} + \ldots$$

After scaling and addition, the first term in $S_1$ approximately cancels the +1 ambiguity in the image, the second term adds a smaller ambiguity, and the third term adds a radiometric error of order:

$$\frac{D_{RX_0}(\theta_0+\varepsilon_0)}{D_{RX_1}(\theta_0+\varepsilon_0)}.$$

It follows that for the same range sample, the signal received from the beam directed at the −1 ambiguity is $$S_{-1} = \frac{\sigma_0(\beta_{-1})D_{TX}(\theta_{-1}+\varepsilon_0)D_{RX_{-1}}(\theta_{-1}+\varepsilon_{-1})}{R_{-1}^3 \sin(\beta_{-1})} + \quad \text{(Eq. 3)}$$

$$\frac{\sigma_0(\beta_{-2})D_{TX}(\theta_{-2}+\varepsilon_0)D_{RX_{-1}}(\theta_{-2}+\varepsilon_{-1})}{R_{-2}^3 \sin(\beta_{-2})} +$$

$$\frac{\sigma_0(\beta_0)D_{TX}(\theta_0+\varepsilon_0)D_{RX_{-1}}(\theta_0+\varepsilon_{-1})}{R_0^3 \sin(\beta_0)} +$$

$$\frac{\sigma_0(\beta_1)D_{TX}(\theta_1+\varepsilon_0)D_{RX_{-1}}(\theta_1+\varepsilon_{-1})}{R_1^3 \sin(\beta_1)} +$$

$$\frac{\sigma_0(\beta_2)D_{TX}(\theta_2+\varepsilon_0)D_{RX_{-1}}(\theta_2+\varepsilon_{-1})}{R_2^3 \sin(\beta_2)} + \ldots$$

The corrected signal is then $$S_{0_{corr}} = S_0 - \frac{D_{RX_0}(\theta_1+\varepsilon_0)}{D_{RX_1}(\theta_1+\varepsilon_1)} S_1 - \frac{D_{RX_0}(\theta_{-1}+\varepsilon_0)}{D_{RX_{-1}}(\theta_{-1}+\varepsilon_{-1})} S_{-1} + \quad \text{(Eq. 4)}$$

(higher order ambiguities from $D_{TX}D_{RX_n}$ and $D_{TX}D_{RX_0}$) +

(radiometric errors arising from 3rd term of $S_1$ and $S_2$)

In this formulation $D_{TX}$ is the transmit beam pattern and is the same for all beams, and $D_{RX_n}$ is the receive beam pattern, which has a peak at $\theta_n$ for a given beam n.

Equations 5, 6, and 7 can also be cast into a linear system of the form $$\vec{S} = M \cdot \vec{S^c} + \vec{Res} \quad \text{(Eq. 5)}$$

where:

$\vec{S^c}$ is the vector of $[S_0, S_{-1}, S_1, \ldots]^T$ (with the number of elements equal to the number of beams received)

$\vec{S}$ is the vector of the desired ambiguity free signals $[S_0^c, S_{-1}^c, S_1^c, \ldots]^T$ etc.

M is the square matrix formed from the proper ratios of the beam patterns at the contributing angles, as found in equations 2, 5, and 6

Figure 6A:
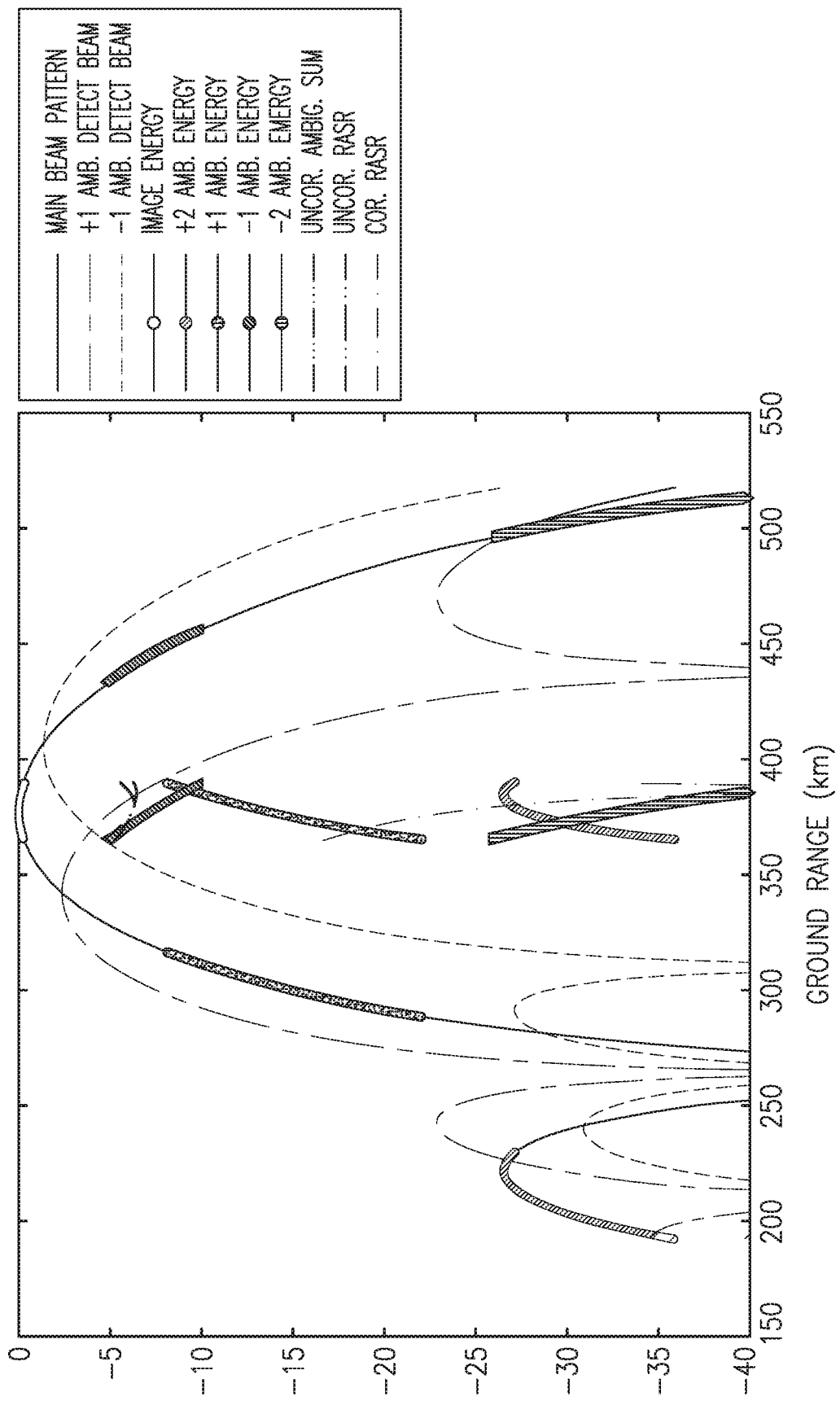
FIGS. 6A, 6B, 7A and 7B are black and white and color graphs illustrating an embodiment of using independent digitally beam-formed beams to reduce range ambiguities.
Figure 6B:
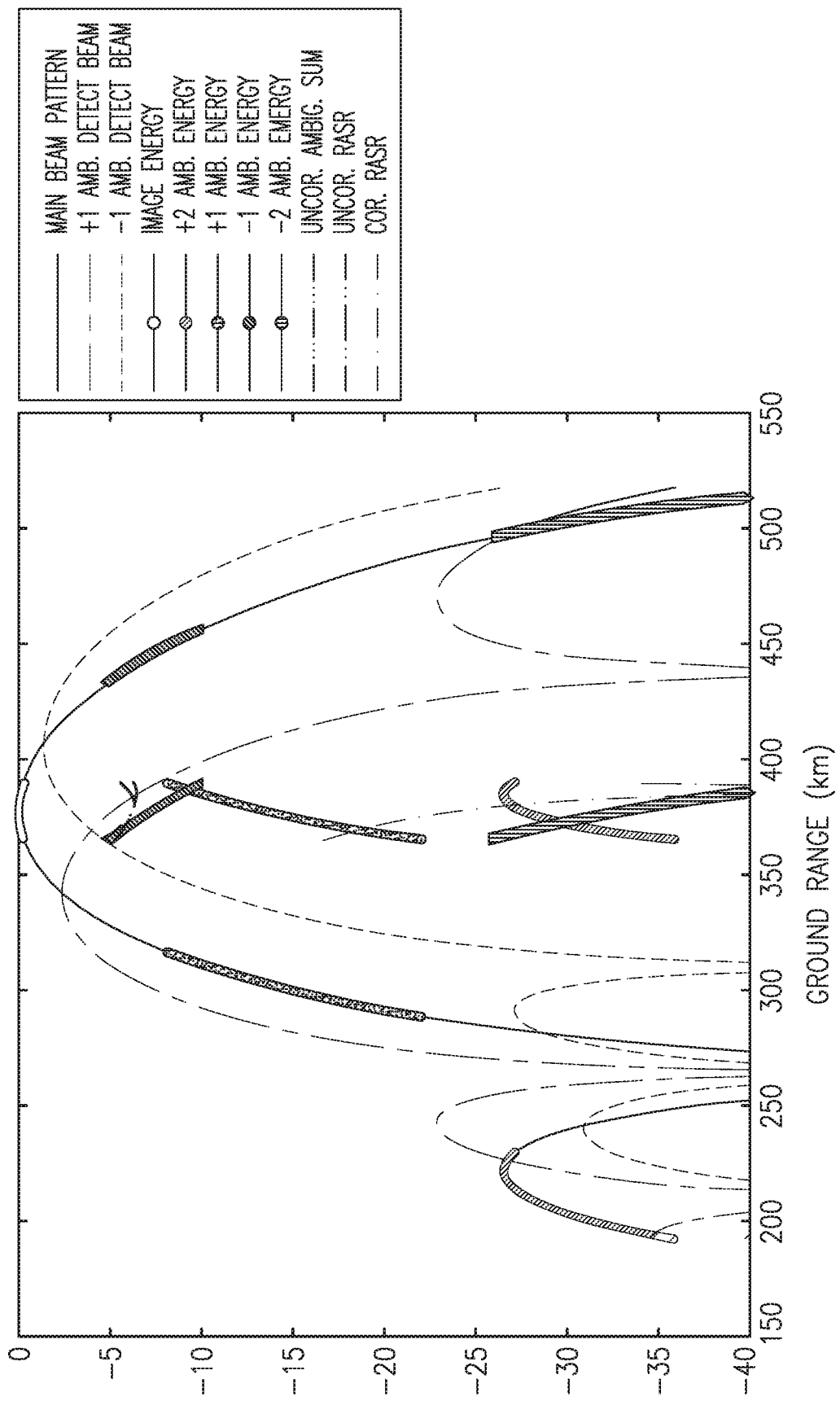
Figure 7A:
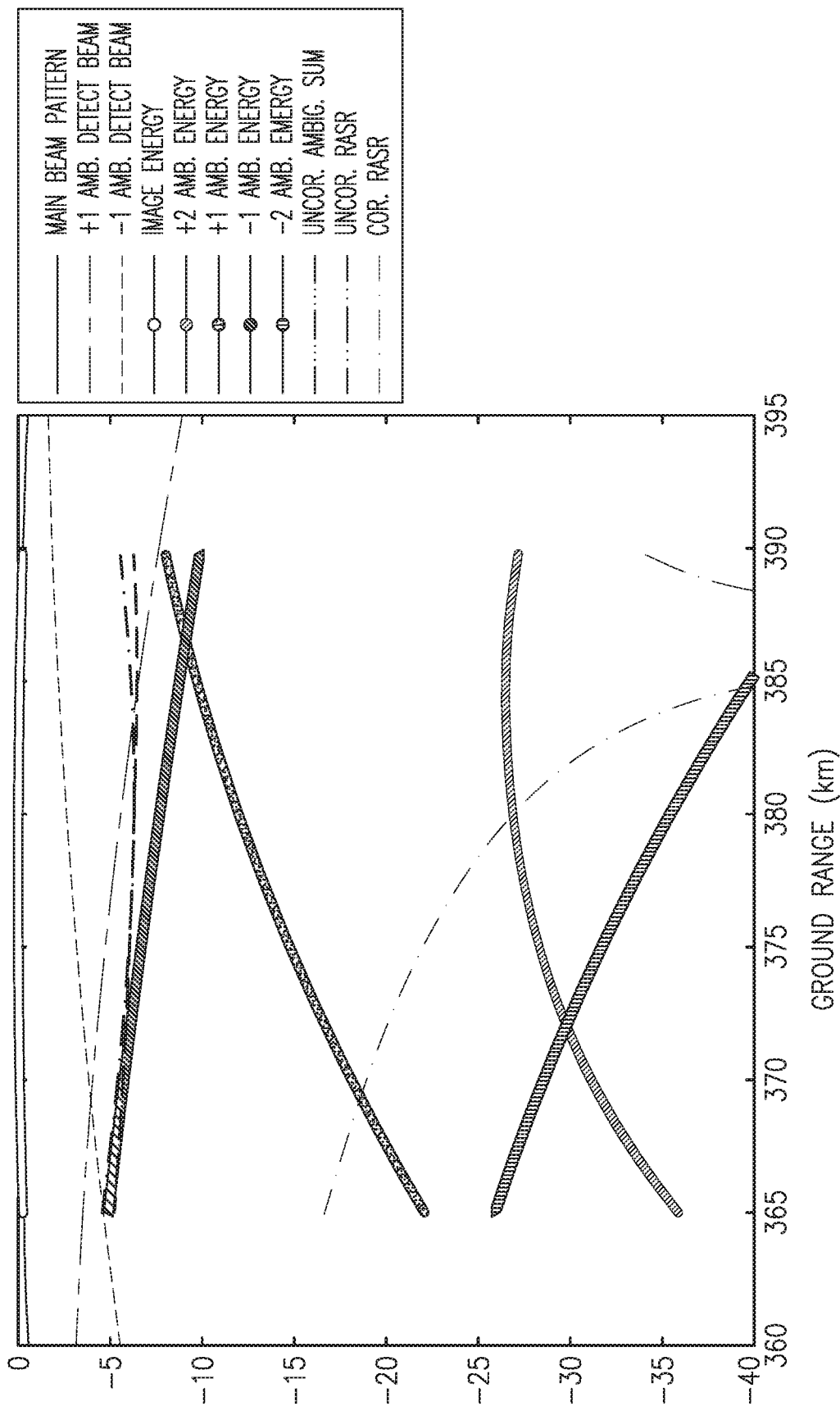
Figure 7B:
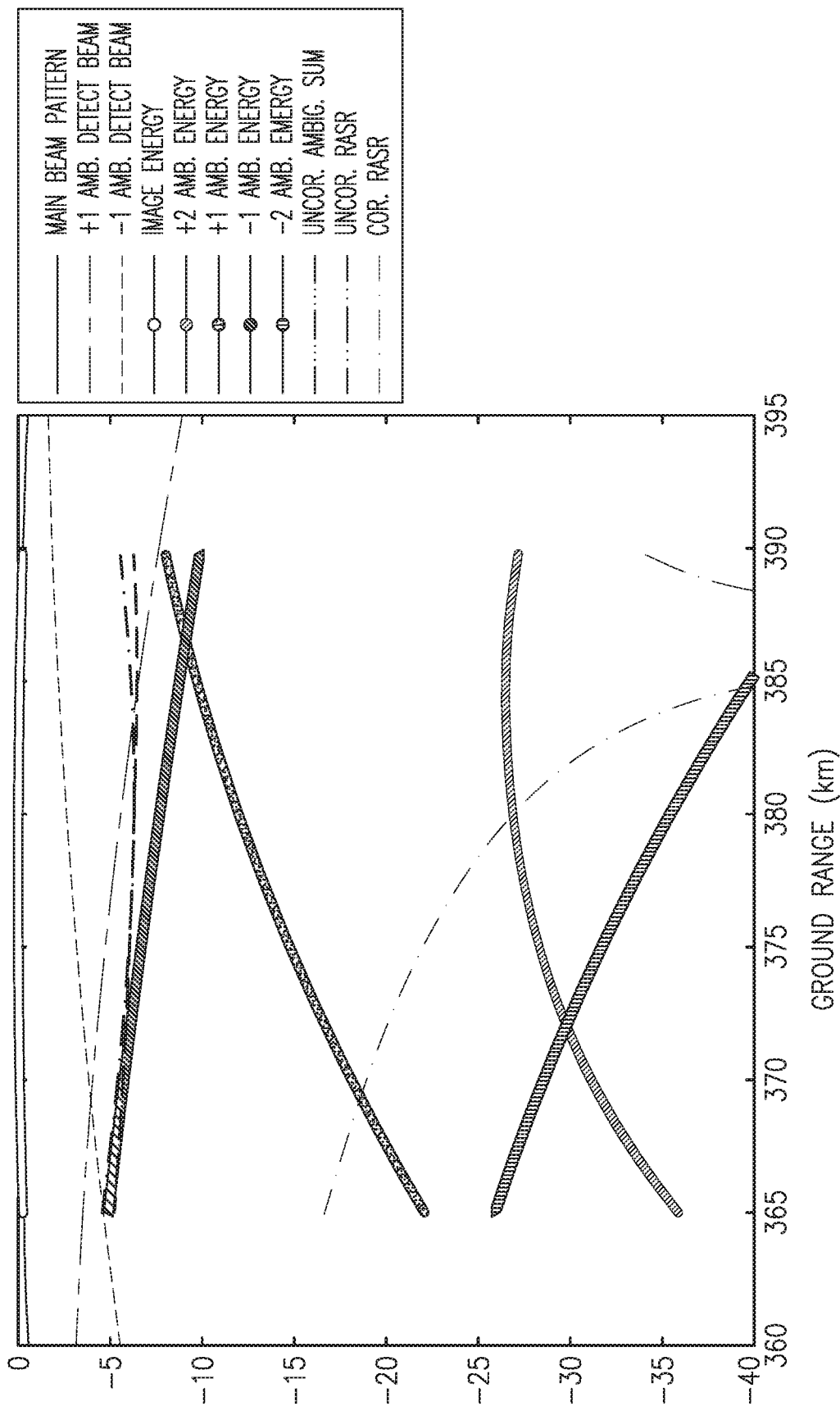

$\vec{Res}$ are the residual contributions from equations 2, 5, and 6 not accounted for by $M \cdot \vec{S^c}$ Assuming $\vec{Res} = 0$, then solving this system for $\vec{S^c}$ will provide an estimate of the signals without the interrogated ambiguities, of which $S_0^c$ is the desired solution. This approach allows for removing the effect on the non-ambiguous signal in the interrogation beams, further increasing the effectiveness of this approach. FIGS. 6A and 6B show the effect of this approach in reducing ambiguities at a look angle of 40 degrees. The worst uncorrected range ambiguity to signal ratio is nearly −5 dB. After correction, shown as Cor RASR, the range ambiguity to signal ratio drops to −17 db in the worst case with most of the range being substantially better. FIGS. 7A and 7B show the detail of the effect of this approach. Note that this approach is also insensitive to practical spacecraft roll errors, since the matrix is formed from beam ratios.

Note that the formulation above is on a range sample by range sample basis, and the determined vector that is used in the formulation of the matrix M may be stored on board. Thus, an embodiment of this matrix inversion technique may be carried out in real-time on board before or after range pulse compression. Therefore, only a single downlink data stream may be employed if on-board processing is selected.

Figure 8:
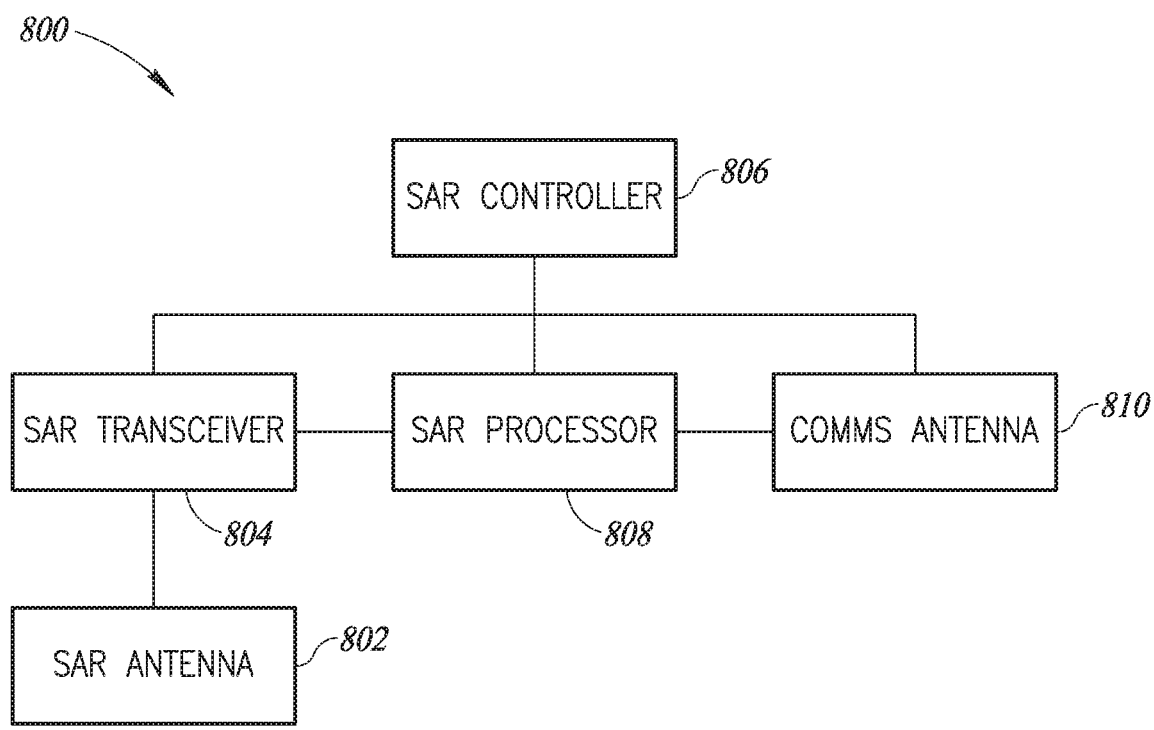
FIG. 8 is a block diagram of a SAR system, in accordance with the systems and methods of the present application.

FIG. 8 is a block diagram of a SAR system 800, in accordance with the systems and methods of the present application. SAR system 800 can be a multi-band SAR system, for example a dual-band XL SAR system. SAR system 800 can be on-board a SAR platform such as an aircraft, unmanned aircraft, drone, satellite, space station, or spacecraft. SAR system 800 comprises a SAR antenna 802, a SAR transceiver 804, a SAR controller 806, a SAR processor 808, and a communications antenna 810. Other SAR systems may be employed, such as a single band SAR.

SAR antenna 802 can be a shared aperture antenna. SAR antenna 802 can be a planar phased array such as described in International Patent Application Publication WO 2017/044168 entitled "EFFICIENT PLANAR PHASED ARRAY ANTENNA ASSEMBLY", for example. SAR antenna 802 is communicatively coupled to transceiver 804. SAR transceiver 804 can transmit and receive pulses at one or more frequency bands, for example at X-band and L-band. SAR transceiver 804 can transmit and receive pulses for two or more frequency bands at the same time. For example, SAR transceiver 804 can transmit and receive L-band pulses for wide-swath SAR imaging and X-band pulses for high-resolution imaging at the same time (e.g., in the same acquisition window). The pulses can be synchronized with each other. The SAR antenna can transmit and receive pulses for one or more imaging modes such as ScanSAR mode and strip-map mode. SAR transceiver 804 can transmit and receive pulses in one or more beams, and in one or more sub-beams. In some implementations, SAR transceiver 804 includes one or more transmit/receive modules (also referred to in the present application as TR modules). In some implementations, SAR transceiver 804 includes a transmitter and a separate receiver. In some embodiments, the SAR transceiver 804, in operation, digitally creates a plurality of beams simultaneously. The beams are used to interrogate a desired swath, as well as areas of dominant ambiguous signals.

SAR controller 806 can comprise one or more processors. SAR controller 806 can include at least one of a Field-Programmable Gate Array (FPGA), an Application Specific Integrated Circuit (ASIC), a microcontroller, and a microprocessor, and one or more programs or firmware stored on one or more nontransitory computer- or processor-readable media.

SAR processor 808 can process SAR data acquired by SAR antenna 802 and SAR transceiver 804. SAR processor 808 can process data in near-real-time. SAR processor 808 can perform range compression, azimuth compression, target detection and identification, chip extraction, velocity estimation, and/or image classification. SAR processor 808 can process data for one or more imaging modes of SAR system 800. In one implementation, SAR processor 808 can process wide-swath ScanSAR mode and high-resolution strip-map mode data. In one implementation, SAR processor 808 can process strip-map mode data and Spotlight mode data. In one implementation, SAR processor 808 can process at least two of wide-swath ScanSAR mode, strip-map mode, high-resolution strip-map mode, and Spotlight mode data.

Communications antenna 810 can transmit and receive data, for example communications antenna 810 can transmit acquired SAR data, processed SAR targets, target detections, identifications, and image classifications from SAR system 800 to a ground terminal. Communications antenna 810 can receive commands and/or ancillary data from a ground terminal. The ground terminal (not shown in FIG. 8) can include a communications antenna and a transceiver.

Embodiments of an SAR system may include fewer components than illustrated, may include more components that illustrated, may combine illustrated components, may separate illustrated components into separate components, and various combinations thereof. For example, the SAR controller 806 and the SAR processor 808 may be combined into a single processor in some embodiments.

Figure 9:
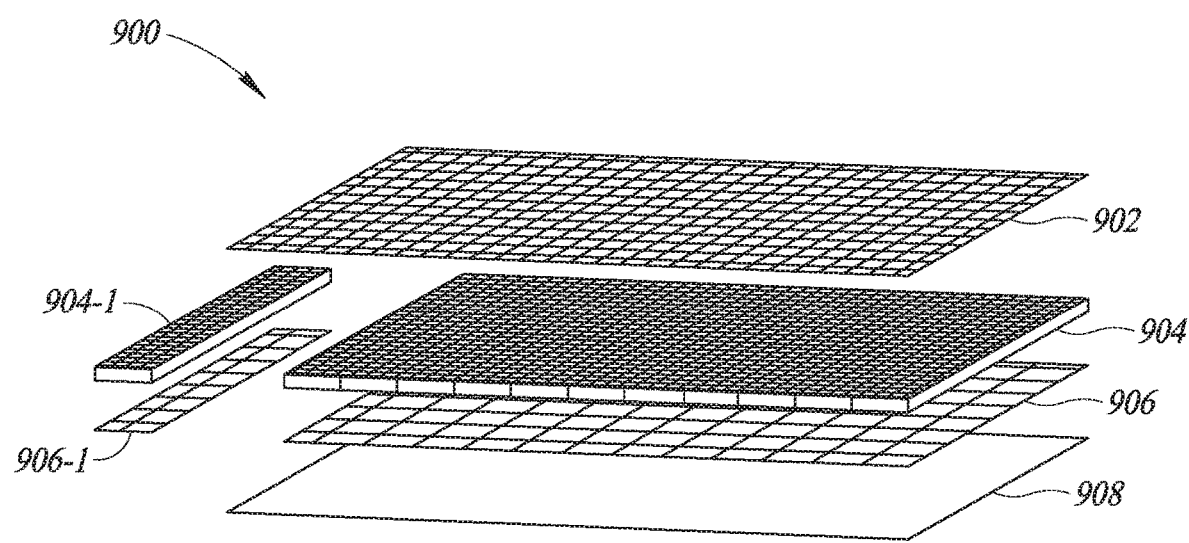
FIG. 9 shows an example efficient planar phased array antenna assembly, in accordance with the systems and methods described in the present application.

SAR antenna 802 of FIG. 8 can be, for example, a planar phased array antenna. FIG. 9 shows an example efficient planar phased array antenna assembly 900. The size of antenna assembly 900 can be tailored to meet the gain and bandwidth requirements of a particular application. An example application is a dual-band, dual-polarization SAR antenna. In an example implementation of a dual-band, dual-polarization SAR antenna, assembly 900 is approximately 2.15 m wide, 1.55 m long and 50 mm deep, and weighs approximately 30 kg. In another implementation, SAR antenna 902 comprises a single panel of dimensions 6 m by 2 m. In yet another implementation, SAR antenna 902 comprises six panels, each panel of dimensions 1 m by 2 m.

Example antenna assembly 900 of FIG. 9 is a dual-band (X-band and L-band), dual-polarization (H and V polarizations at L-band) SAR antenna assembly. While embodiments described in this document relate to dual X-band and L-band SAR antennas, and the technology is particularly suitable for space-based SAR antennas for reasons described elsewhere in this document, a similar approach can also be adopted for other frequencies, polarizations, configurations, and applications including, but not limited to, single-band and multi-band SAR antennas at different frequencies, and microwave and mm-wave communication antennas.

Antenna assembly 900 comprises a first face sheet 902 on a top surface of antenna assembly 900, containing slots for the L-band and X-band radiating elements. Antenna assembly 900 comprises microwave structure 904 below first face sheet 902. Microwave structure 904 comprises one or more subarrays such as subarray 904-1, each subarray comprising L-band and X-band radiating elements.

Microwave structure 904 can be a metal structure that is self-supporting without a separate structural subassembly. Microwave structure 904 can be machined or fabricated from one or more metal blocks, such as aluminium blocks or blocks of another suitable conductive material. The choice of material for microwave structure 904 determines, at least in part, the losses and therefore the efficiency of the antenna.

Antenna assembly 902 comprises second face sheet 906 below microwave structure 904, second face sheet 906 closing one or more L-band cavities at the back. Second face sheet 906 comprises one or more sub-array face sheets such as 906-1.

Antenna assembly 900 comprises third face sheet 908 below second face sheet 906, third face sheet 908 comprising waveguide terminations. Third face sheet 908 also provides at least partial structural support for antenna assembly 900.

In some implementations, antenna assembly 900 comprises a multi-layer printed circuit board (PCB) (not shown in FIG. 9) below third face sheet 908, the PCB housing a corporate feed network for the X-band and L-band radiating elements. Other antenna assemblies may be employed, such as other SAR assemblies, multi-aperture SAR assemblies, TOPSAR, ScanSAR, multi-beam ScanSAR, staggered PRF, SCORE, and used in various operational modes in various embodiments.

Figure 10:
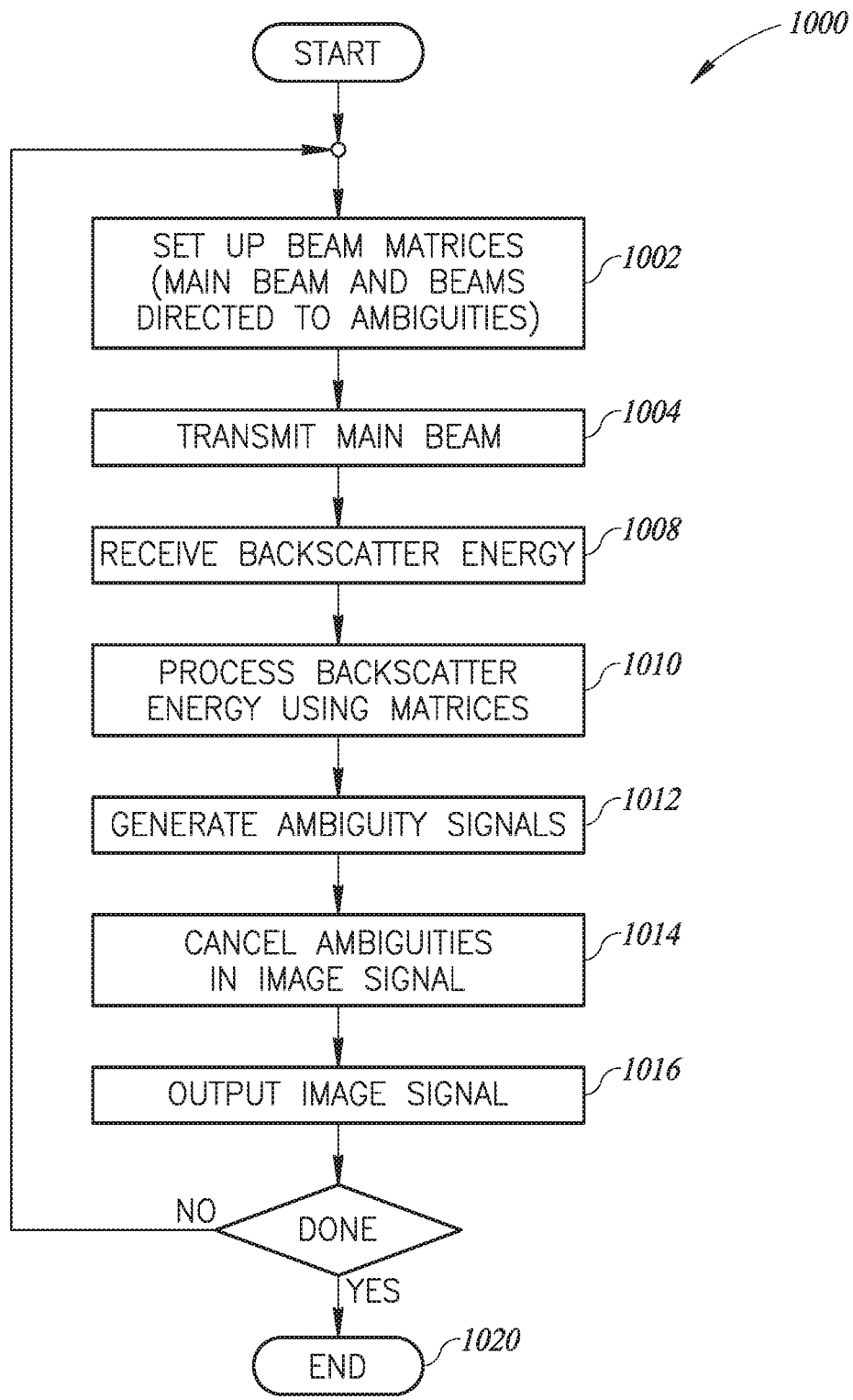
FIG. 10 is a flow chart illustrating a method of operation of a SAR (such as the SAR of FIG. 8) in accordance with the systems and methods described in the present application.

FIG. 10 is a flow chart illustrating one example process 1000 of generating an image using an SAR system. The process 1000 may be performed, for example, by the SAR system 800 of FIG. 8.

At 1002, the process 1000 generates or sets up matrices used to create beams of the SAR system, including a main or first beam of the SAR system to illuminate a swath for which an image is desired, and one or more beams to illuminate range ambiguities. Conventionally, matrices are generated so as to avoid range ambiguities. Locating range ambiguities and generating matrices to direct a beam at a desired location are known, and may be done based, for example, on backscatter signals received from the ground. As opposed to conventional beam forming to direct beams away from range ambiguities, matrices are generated which direct the beams at range ambiguities, including ambiguities which may be on the main lobe of the backscatter energy. The process 1000 proceeds from 1002 to 1004.

At 1004, the process 1000 transmits a pulse via the first beam. The process 1000 proceeds from 1004 to 1008.

At 1008, the process 1000 receives backscatter energy simultaneously from the main beam. The process 1000 proceeds from 1008 to 1010.

At 1010, the process 1000 processes the backscatter energy using the matrices set up at 1002, generating a first signal associated with the first beam directed at the swath, and one or more second signals associated respective beams of the one or more beams directed to the range ambiguities. The process 1000 proceeds from 1010 to 1012.

At 1012, the process 1000 generates ambiguity signals. This may be done by, for example, combining the second signals with respective determined complex vectors, which are based on ratios of the complex sensitivity of the first beam to the complex sensitivity of the respective second beam, generating one or more ambiguity signals. The process 1000 proceeds from 1012 to 1014.

At 1014, the process generates an image signal associated with the swath. This may be done, for example, by combining the first signal with one or more of the ambiguity signals, at least partially cancelling ambiguities in the first signal. The process 1000 proceeds from 1014 to 1016.

At 1016, the process 1000 outputs the image signal. The process proceeds from 1016 to 1018.

At 1018, the process 1000 determines whether to image another swath, for example, based on control signals received via a communication antenna. When it is determined at 1018 to image another swath, the process 1000 proceeds from 1018 to 1002. When it is not determined at 1018 to image another swath, the process proceeds from 1018 to 1020, where the process 1000 may terminate or perform other processing on the image or image data.

Embodiments of the process 1000 of FIG. 10 may include more acts than illustrated, may include fewer acts than illustrated, may separate illustrated acts into multiple acts, may combine illustrated acts into fewer acts, and may perform illustrated acts in various orders, which may include performing illustrated acts in parallel or using an iterative process. For example, in an embodiment of the process 1000, compensation for an estimated calibration error may be applied. In another example, data may be transmitted after act 1010 to a remote (e.g., ground-based) server for performing acts 1012, 1014 and 1016 at the remote server.

One or more embodiments may provide one or more of the following advantages as compared to conventional approaches: range ambiguities may be efficiently suppressed in SmallSat digital beamforming SARS operating in a single imaging beam mode, in which range ambiguities are usually on the main lobe of the main beam; directing interrogation beams at the range ambiguities facilitates generating highly accurate estimates of the dominant range ambiguities; measuring range ambiguities using the same pulse employed to image the swath facilitates the range ambiguity signal and the main beam signal being very similar, which facilitates simplifying the processing and thus facilitates using onboard real-time processing of the image data; the beams may be closer together, which may facilitate reducing the effects from range cell migration, topography, curved Earth and non-separable beam patterns; and range ambiguities being located on the main lobe of the beam may simplify weighting vector calculations and provide more stability in the presence of thermoelastic distortion.

The various embodiments described above can be combined to provide further embodiments. Aspects of the embodiments can be modified, if necessary, to employ systems, circuits and concepts of the various patents, applications and publications to provide yet further embodiments. The teachings of U.S. provisional patent application Ser. No. 62/590,153 are incorporated herein by reference in their entirety.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

While particular elements, embodiments and applications of the present technology have been shown and described, it will be understood, that the technology is not limited thereto since modifications can be made by those skilled in the art without departing from the scope of the present disclosure, particularly in light of the foregoing teachings.

In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method of operation of a synthetic aperture radar (SAR) system comprising at least one SAR antenna, at least one SAR processor and at least one SAR transceiver, the method comprising:
defining a first beam to illuminate a first swath using the at least one SAR antenna;
defining a second beam to illuminate a first area of ambiguity associated with the first beam;
transmitting a pulse via the first beam and receiving backscatter energy;
generating, by the at least one SAR processor based on the received backscatter energy, a first signal associated with the first beam and a second signal associated with the second beam;
combining the second signal with a first determined complex vector, generating a first ambiguity signal; and
combining the first signal with the first ambiguity signal, generating an image signal associated with the first swath.

2. The method of claim 1, comprising:
defining a third beam to illuminate a second area of ambiguity associated with the first beam;
generating, by the at least one SAR processor based on the received backscatter energy, a third signal associated with the third beam;
combining the third signal with a second determined complex vector, generating a second ambiguity signal; and
combining the first signal with the first ambiguity signal and the second ambiguity signal, generating the image signal associated with the first swath.

3. The method of claim 1 wherein a determined complex vector represents a ratio of a complex sensitivity of the first beam to a complex sensitivity of a beam illuminating an area of ambiguity associated with the first beam.

4. The method of claim 1 wherein the first and second beams are multiple simultaneous elevation beams.

5. The method of claim 1 wherein the first and second beams are formed from an aperture.

6. The method of claim 1, comprising:
operating the SAR in a Quad-Pol, single imaging beam mode.

7. The method of claim 1 wherein directing a beam to illuminate an area of ambiguity associated with the first beam comprises directing the beam based on one or more of:
a beam center offset; or
beam pattern shaping.

8. The method of claim 1, comprising directing beams at non-sequential areas of ambiguity associated with the first beam.

9. The method of claim 1 wherein the combining the first signal with an ambiguity signal at least partially cancels ambiguous energy present in the first signal.

10. The method of claim 1 wherein the combining the first signal with an ambiguity signal comprises applying linear algebra.

11. The method of claim 1 wherein the combining the first signal with an ambiguity signal comprises subtracting the ambiguity signal from the first signal.

12. The method of claim 1 wherein the SAR comprises multiple overlapping or non-overlapping azimuth apertures and the method comprises using azimuth modulation.

13. The method of claim 1, comprising using alternating up/down chirp modulation.

14. The method of claim 1, comprising using a multi-polarization mode with 5 beams receiving backscatter energy at each polarization.

15. The method of claim 1 wherein the SAR operates in an L-band.

16. The method of claim 1, comprising estimating a calibration error associated with a ratio of complex sensitive and compensating for the calibration error.

17. The method of claim 1 wherein the ambiguity is a range ambiguity located on a main lobe of the first beam.

18. The method of claim 1 wherein the range ambiguity is measured on backscatter of the pulse transmitted on the first beam.

19. A synthetic aperture radar (SAR) system comprising at least one SAR antenna, at least one SAR processor and at least one SAR transceiver, the SAR system operable to perform actions, the actions comprising:
   defining a first beam to illuminate a first swath using the at least one SAR antenna;
   defining a second beam to illuminate a first area of ambiguity associated with the first beam;
   transmitting a pulse via the first beam and receiving backscatter energy;
   generating, by the at least one SAR processor based on the received backscatter energy, a first signal associated with the first beam and a second signal associated with the second beam;
   combining the second signal with a first determined complex vector, generating a first ambiguity signal; and
   combining the first signal with the first ambiguity signal, generating an image signal associated with the first swath.

20. The SAR system of claim 19 wherein the at least one SAR antenna, the at least one SAR processor and the at least one SAR transceiver are co-located on a spaceborne or airborne SAR platform.

21. The SAR system of claim 19 wherein the at least one SAR antenna, the at least one SAR processor and the at least one SAR transceiver are co-located on a free-flying spacecraft.

22. A method of operation of a synthetic aperture radar (SAR) system comprising at least one SAR antenna, at least one SAR processor and at least one SAR transceiver, the method comprising:
   defining a first beam to illuminate a first swath using the at least one SAR antenna;
   defining a plurality of second beams to illuminate respective areas of ambiguity associated with the first beam;
   transmitting a pulse via the first beam and receiving backscatter energy;
   generating, by the at least one SAR processor and based on the backscatter energy, a first signal associated with the first beam and a plurality of second signals associated with respective beams of the plurality of second beams;
   combining the signals of the plurality of second signals with respective determined complex vectors, generating a plurality of ambiguity signals; and
   combining the first signal with the plurality of ambiguity signals, generating an image signal associated with the first swath.

* * * * *